United States Patent
Matsuo

(10) Patent No.: US 8,256,292 B2
(45) Date of Patent: Sep. 4, 2012

(54) ACCELERATION SENSOR WITH SURFACE PROTECTION

(75) Inventor: Kaoru Matsuo, Kagoshima (JP)

(73) Assignee: KYOCERA Corporation, Kyoto (JP)

( * ) Notice: Subject to any disclaimer, the term of this patent is extended or adjusted under 35 U.S.C. 154(b) by 484 days.

(21) Appl. No.: 12/524,651

(22) PCT Filed: Jan. 29, 2008

(86) PCT No.: PCT/JP2008/051319
§ 371 (c)(1),
(2), (4) Date: Jul. 27, 2009

(87) PCT Pub. No.: WO2008/093680
PCT Pub. Date: Aug. 7, 2008

(65) Prior Publication Data
US 2010/0037693 A1    Feb. 18, 2010

(30) Foreign Application Priority Data

| Jan. 29, 2007 | (JP) | 2007-017764 |
| Feb. 19, 2007 | (JP) | 2007-037375 |
| Feb. 23, 2007 | (JP) | 2007-043818 |
| Mar. 27, 2007 | (JP) | 2007-082454 |

(51) Int. Cl.
*G01P 15/09* (2006.01)

(52) U.S. Cl. .................................................. 73/514.34

(58) Field of Classification Search ............... 73/514.34, 73/514.33, 514.29, 514.16
See application file for complete search history.

(56) References Cited

U.S. PATENT DOCUMENTS

| 5,302,880 | A  | * | 4/1994  | Kaida         | 310/370    |
| 5,341,550 | A  |   | 8/1994  | Kaida         |            |
| 6,619,124 | B2 | * | 9/2003  | Ogiura        | 73/514.34  |
| 6,672,160 | B2 | * | 1/2004  | Tabota        | 73/514.29  |
| 6,766,690 | B2 | * | 7/2004  | Tabota        | 73/514.34  |
| 6,786,095 | B2 | * | 9/2004  | Tabota        | 73/514.29  |
| 6,810,740 | B2 | * | 11/2004 | Tabota        | 73/514.34  |
| 7,134,339 | B2 | * | 11/2006 | Mikado et al. | 73/514.29  |
| 7,194,906 | B2 | * | 3/2007  | Mikado et al. | 73/514.34  |
| 7,353,707 | B2 | * | 4/2008  | Mikado et al. | 73/514.34  |
| 7,624,639 | B2 | * | 12/2009 | Eimori et al. | 73/514.34  |

FOREIGN PATENT DOCUMENTS

| JP | 6-69748     | 3/1994  |
| JP | 8-15301     | 1/1996  |
| JP | 8-94467     | 4/1996  |
| JP | 2002-107373 | 4/2002  |
| JP | 2005-315847 | 11/2005 |

* cited by examiner

*Primary Examiner* — Helen C. Kwok
(74) *Attorney, Agent, or Firm* — Procopio, Cory, Hargreaves & Savitch LLP

(57) ABSTRACT

An acceleration sensor has a pair of main surface protection members arranged at one end of both main surfaces of a piezoelectric oscillation element, and spaced from the main surfaces through a pair of main surface spacer members. An end surface protection member is arranged on an end surface at the other end of the main surface protection members by having an interval between the end surface protection member and the piezoelectric oscillation element, through a pair of end surface spacer members. A pair of side surface protection members is arranged at one end of the both side surfaces of the piezoelectric vibration element, the pair of main surface protection members, the end surface protection member, the pair of main surface spacer members, and a pair of side surface spacer members arranged on both side surfaces of the end surface spacer members.

11 Claims, 30 Drawing Sheets

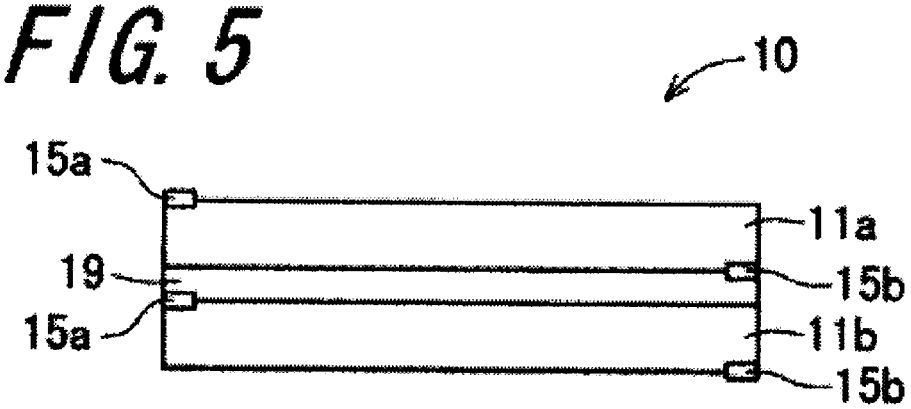
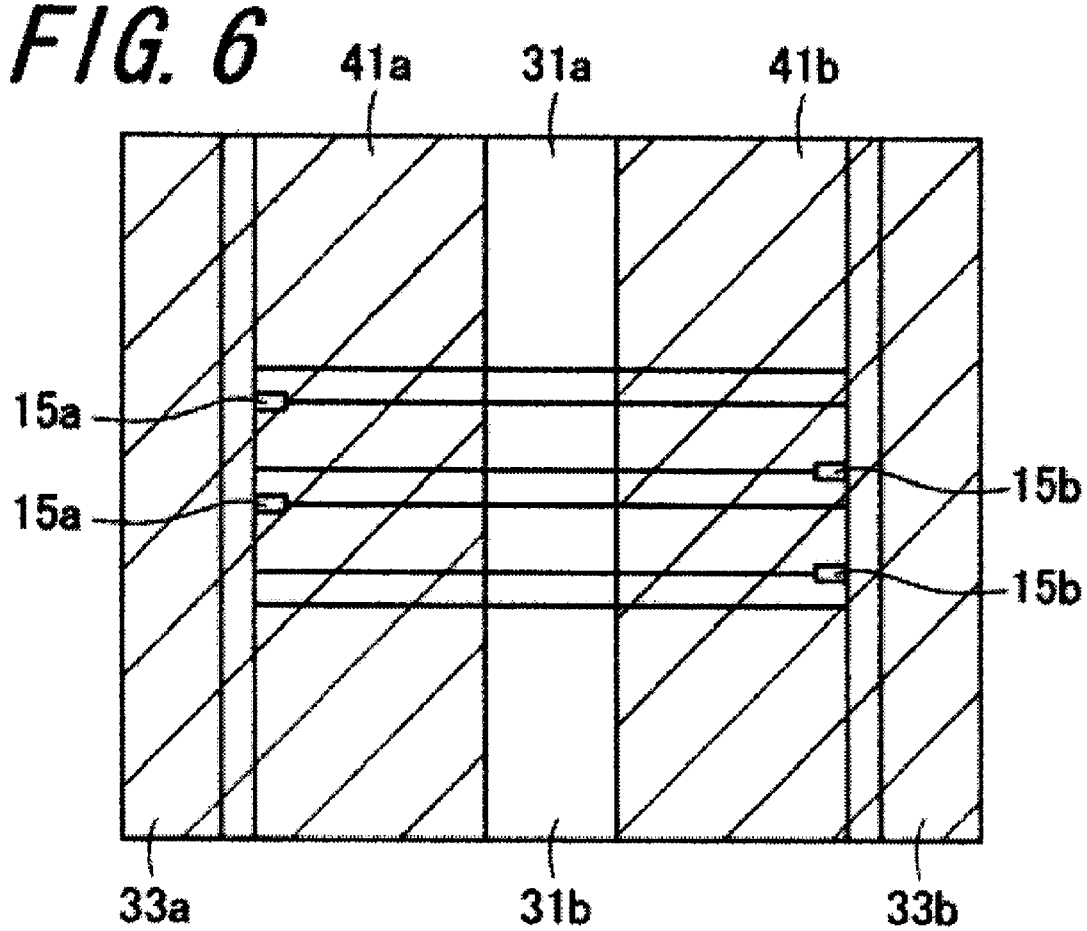

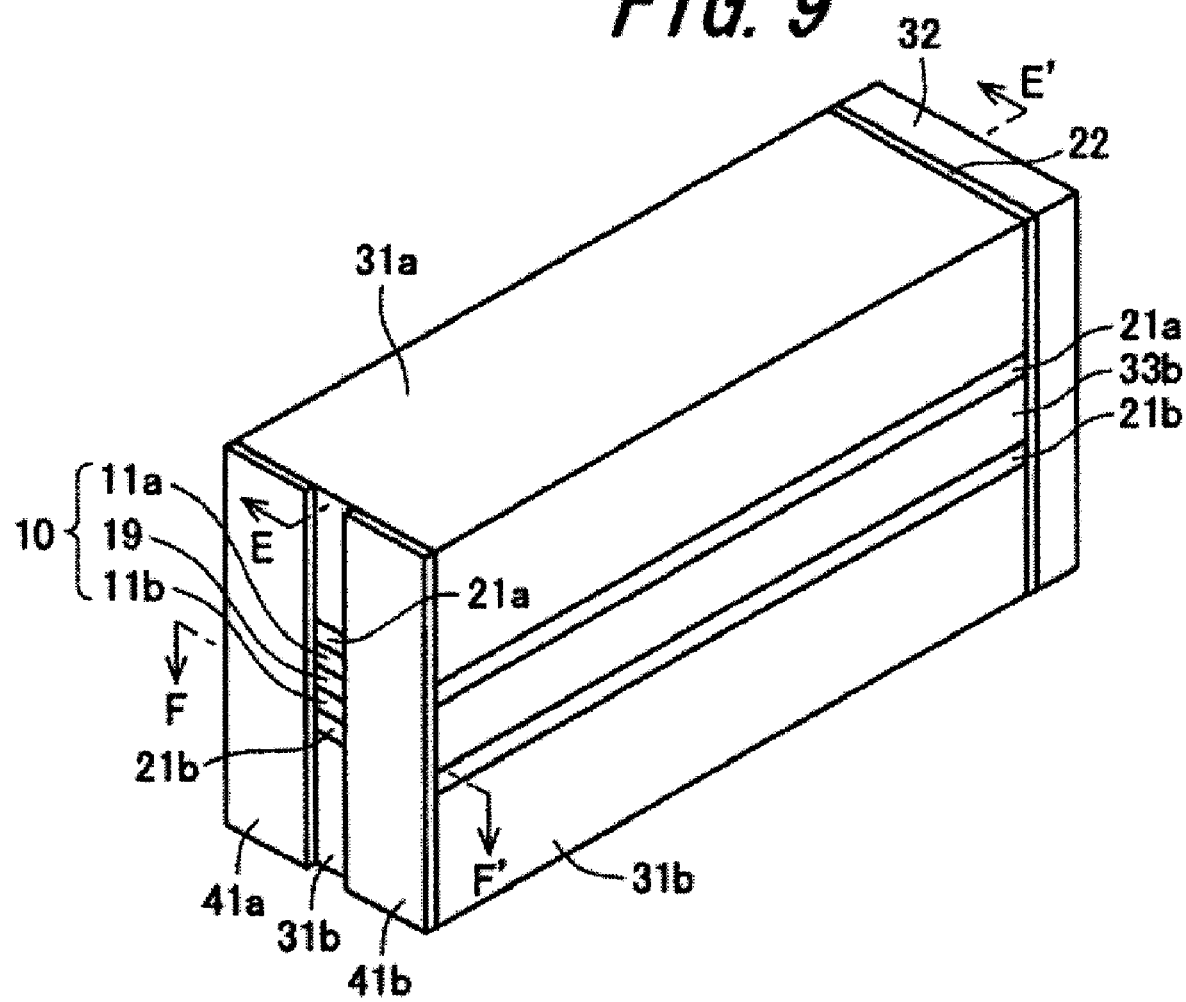

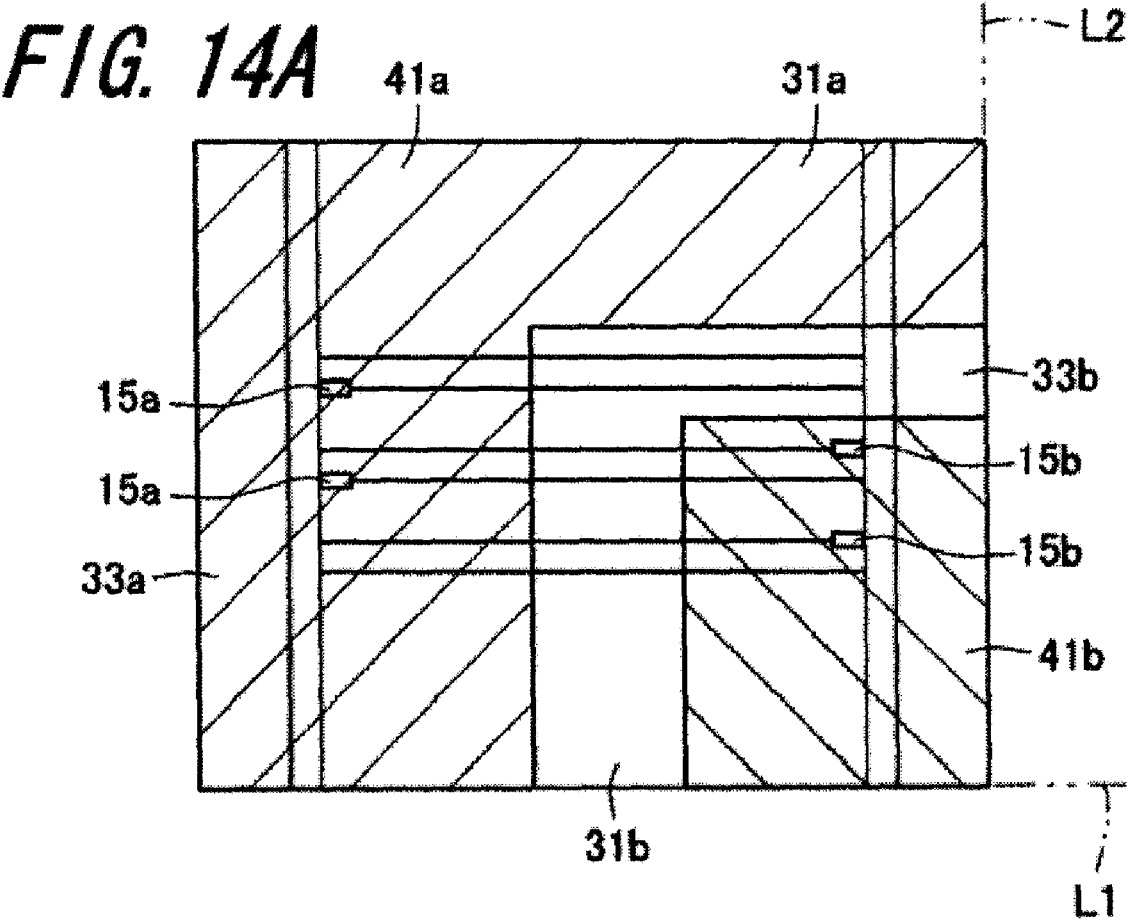

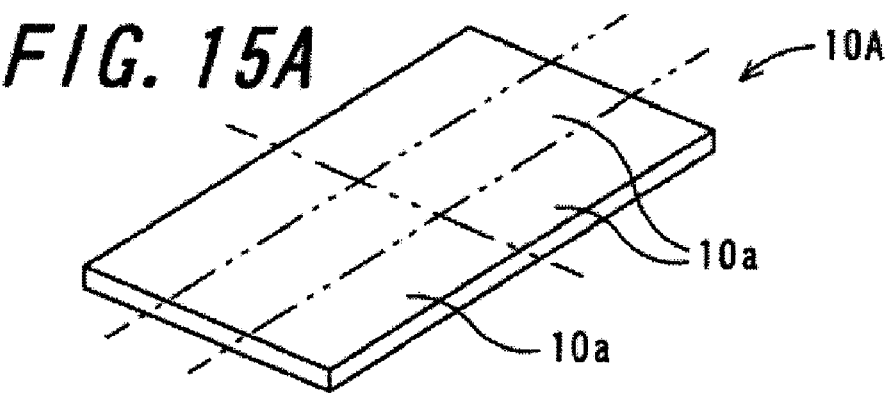
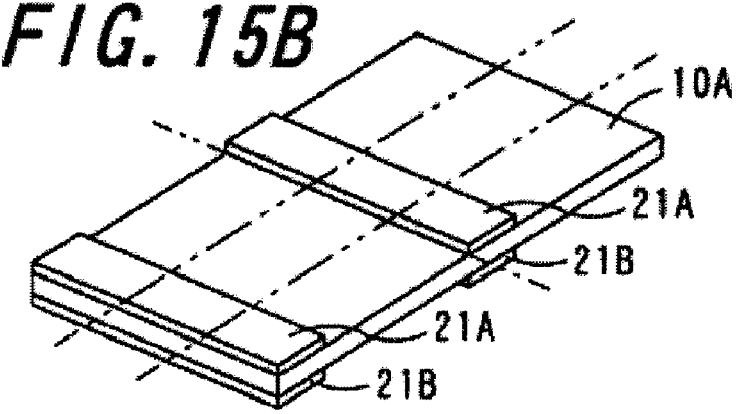
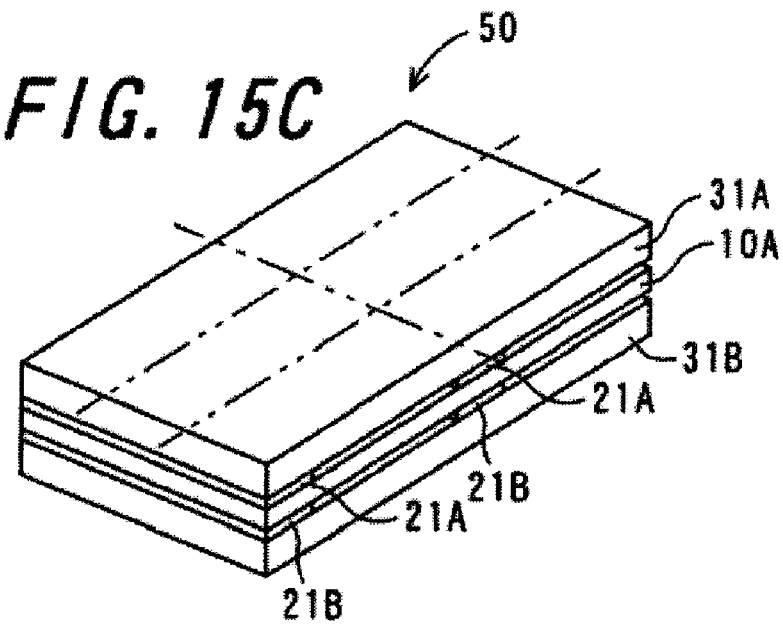

ACCELERATION SENSOR WITH SURFACE PROTECTION

CROSS REFERENCE TO RELATED APPLICATION

The present application is the United States national stage application of international application serial number PCT/JP2008/051319, filed 29 Jan. 2008, which claims priority to Japanese patent application no. 2007-017764, filed 29 Jan. 2007, Japanese patent application no. 2007-037375 filed 19 Feb. 2007, Japanese patent application no. 2007-043818, filed 23 Feb. 2007, and Japanese patent application no. 2007-082454, filed 27 Mar. 2007, each of which is incorporated herein by reference in its entirety.

FIELD OF THE INVENTION

The present invention relates to acceleration sensors, and particularly, to an acceleration sensor that is simple-structured and easy to manufacture as well as being compact and having high acceleration-detecting sensitivity.

BACKGROUND

Acceleration sensors have been used for detecting shock externally applied to electronic devices such as hard drives. A known example of an acceleration sensor, such as the one disclosed in Japanese Unexamined Patent Application Publication No. 2005-315847, has a single-end support structure in which one longitudinal end of a piezoelectric vibrating element, which includes strip-shaped piezoelectric substrates bonded to each other and charge detecting electrodes disposed on opposite principal surfaces thereof, is supported by a support member.

In an acceleration sensor equipped with a piezoelectric vibrating element, the piezoelectric vibrating element bends in response to applied acceleration and causes the piezoelectric substrates to warp. An electric charge produced by a piezoelectric effect is extracted by the charge detecting electrodes on the opposite principal surfaces so that the acceleration is detected. Therefore, in an acceleration sensor with a single-end support structure in which one longitudinal end of the piezoelectric vibrating element is supported, the piezoelectric vibrating element bends by a greater amount in response to applied acceleration, as compared with an acceleration sensor with a double-end support structure in which the opposite longitudinal ends of the piezoelectric vibrating element are supported. Consequently, an acceleration sensor with a single-end support structure can achieve higher acceleration-detecting sensitivity.

However, the acceleration sensor proposed in Japanese Unexamined Patent Application Publication No. 2005-315847 has several problems due to having a structure in which a stationary frame having a through-hole is set in an opening in one surface of a box-shaped casing and the piezoelectric vibrating element is securely fitted and positioned in this through-hole.

The first problem is that size reduction is difficult. With the structure in which the piezoelectric vibrating element is fitted in the through-hole of the stationary frame disposed in the opening in one surface of the box-shaped casing, the distance between an end of the piezoelectric vibrating element fitted in the through-hole and an inner wall surface of the casing cannot be accurately ascertained during assembly. For this reason, the distance between the end of the piezoelectric vibrating element and the inner wall surface of the casing cannot be reduced, making it difficult to achieve size reduction.

The second problem is in the difficulty in manufacture due to a complex structure. Since this complex structure is assembled using many components having complex shapes, such as the box-shaped casing having the opening in one surface thereof and the stationary frame having the through-hole in which the casing is set, the manufacturing process is difficult.

SUMMARY

Embodiments described herein provide an acceleration sensor that is simple-structured and easy to manufacture as well as being compact and having high acceleration-detecting sensitivity.

An acceleration sensor according to a first embodiment includes a piezoelectric vibrating element including a plurality of flat rectangular piezoelectric substrates stacked in a thickness direction and charge detecting electrodes respectively disposed on opposite principal surfaces thereof; a pair of principal-surface spacer members respectively disposed on the opposite principal surfaces of a first longitudinal end of the piezoelectric vibrating element; a pair of rectangular principal-surface protection members whose end surfaces at first longitudinal ends and second longitudinal ends thereof are respectively flush with end surfaces at the first longitudinal end and a second longitudinal end of the piezoelectric vibrating element, the pair of rectangular principal-surface protection members being respectively spaced apart from the opposite principal surfaces of the piezoelectric vibrating element by the pair of principal-surface spacer members; a pair of end-surface spacer members respectively disposed on the end surfaces at the second longitudinal ends of the pair of principal-surface protection members; an end-surface protection member spaced apart from the end surfaces at the second longitudinal ends of the pair of principal-surface protection members by the end-surface spacer members; a pair of side-surface spacer members respectively disposed on opposite side surfaces of the first longitudinal end of the piezoelectric vibrating element as well as on opposite side surfaces of the pair of principal-surface protection members and the end-surface protection member; and a pair of side-surface protection members respectively spaced apart from the opposite side surfaces of the piezoelectric vibrating element, the pair of principal-surface protection members, and the end-surface protection member by the pair of side-surface spacer members.

An acceleration sensor according to a second embodiment includes a piezoelectric vibrating element including a plurality of flat rectangular piezoelectric substrates stacked in a thickness direction and charge detecting electrodes respectively disposed on opposite principal surfaces thereof; a pair of principal-surface spacer members respectively disposed on the opposite principal surfaces of a first longitudinal end of the piezoelectric vibrating element; a pair of rectangular principal-surface protection members whose end surfaces at first longitudinal ends and second longitudinal ends thereof are respectively flush with end surfaces at the first longitudinal end and a second longitudinal end of the piezoelectric vibrating element, the pair of rectangular principal-surface protection members being respectively spaced apart from the opposite principal surfaces of the piezoelectric vibrating element by the pair of principal-surface spacer members; a pair of side-surface spacer members respectively disposed on opposite side surfaces of the first longitudinal end of the piezoelectric vibrating element as well as on opposite side surfaces of the pair of principal-surface protection members; a pair of rectangular side-surface protection members whose end surfaces at first longitudinal ends and second longitudinal ends thereof are respectively flush with the end surfaces at the first longitudinal end and the second longitudinal end of the piezoelectric vibrating element, the pair of rectangular side-surface protection members being respectively spaced apart from the opposite side surfaces of the piezoelectric vibrating element and the pair of principal-surface protection members by the pair of side-surface spacer members; an end-surface spacer member disposed on the end surfaces at the second longitudinal ends of the pair of principal-surface protection members and the pair of side-surface protection members; and an end-surface protection member spaced apart from the end surfaces at the second longitudinal ends of the piezoelectric vibrating element, the pair of principal-surface protection members, and the pair of side-surface protection members by the end-surface spacer member.

An acceleration sensor according to a third embodiment includes a piezoelectric vibrating element including a plurality of flat rectangular piezoelectric substrates stacked in a thickness direction and charge detecting electrodes respectively disposed on opposite principal surfaces thereof; a pair of side-surface spacer members respectively disposed on the opposite side surfaces of a first longitudinal end of the piezoelectric vibrating element; a pair of rectangular side-surface protection members whose end surfaces at first longitudinal ends and second longitudinal ends thereof are respectively flush with end surfaces at the first longitudinal end and a second longitudinal end of the piezoelectric vibrating element, the pair of rectangular side-surface protection members being respectively spaced apart from the opposite side surfaces of the piezoelectric vibrating element by the pair of side-surface spacer members; a pair of principal-surface spacer members respectively disposed on the opposite principal surfaces of the first longitudinal end of the piezoelectric vibrating element as well as on opposite surfaces, adjacent to the opposite principal surfaces, of the pair of side-surface protection members; a pair of rectangular principal-surface protection members whose end surfaces at first longitudinal ends and second longitudinal ends thereof are respectively flush with the end surfaces at the first longitudinal end and the second longitudinal end of the piezoelectric vibrating element, the pair of rectangular principal-surface protection members being respectively spaced apart from the opposite principal surfaces of the piezoelectric vibrating element and the opposite surfaces, adjacent to the opposite principal surfaces, of the pair of side-surface protection members by the pair of principal-surface spacer members; an end-surface spacer member disposed on the end surfaces at the second longitudinal ends of the pair of principal-surface protection members and the pair of side-surface protection members; and an end-surface protection member spaced apart from the end surfaces at the second longitudinal ends of the piezoelectric vibrating element, the pair of principal-surface protection members, and the pair of side-surface protection members by the end-surface spacer member.

An acceleration sensor according to a fourth embodiment includes a piezoelectric vibrating element including a plurality of flat rectangular piezoelectric substrates stacked in a thickness direction and charge detecting electrodes respectively disposed on opposite principal surfaces thereof; a pair of side-surface spacer members respectively disposed on the opposite side surfaces of a first longitudinal end of the piezoelectric vibrating element; a pair of rectangular side-surface protection members whose end surfaces at first longitudinal ends and second longitudinal ends thereof are respectively flush with end surfaces at the first longitudinal end and a second longitudinal end of the piezoelectric vibrating element, the pair of rectangular side-surface protection members being respectively spaced apart from the opposite side surfaces of the piezoelectric vibrating element by the pair of side-surface spacer members; a pair of end-surface spacer members respectively disposed on the end surfaces at the second longitudinal ends of the pair of side-surface protection members; an end-surface protection member spaced apart from the end surfaces at the second longitudinal ends of the piezoelectric vibrating element and the pair of side-surface protection members by the end-surface spacer members; a pair of principal-surface spacer members respectively disposed on the opposite principal surfaces of the first longitudinal end of the piezoelectric vibrating element as well as on opposite surfaces, adjacent to the opposite principal surfaces, of the pair of side-surface protection members and the end-surface protection member; and a pair of rectangular principal-surface protection members respectively spaced apart from the opposite principal surfaces of the piezoelectric vibrating element and the opposite surfaces of the pair of side-surface protection members and the end-surface protection member, adjacent to the opposite principal surfaces, by the pair of principal-surface spacer members.

In one embodiment, each of the charge detecting electrodes is extended to the end surface at the first longitudinal end of the piezoelectric vibrating element, and the end surface at the first longitudinal end of the piezoelectric vibrating element is provided with an external terminal electrically connected to the charge detecting electrode.

In one embodiment, one charge detecting electrode is electrically connected to a first external terminal and another charge detecting electrode is electrically connected to a second external terminal. The first external terminal and the second external terminal are spaced apart from each other. The first external terminal in one embodiment extends from the one charge detecting electrode to a first intersection line as well as from the one charge detecting electrode to a second intersection line. Specifically, the first intersection line is defined by a first imaginary plane including the end surface at the first end of the piezoelectric vibrating element and by a second imaginary plane including an exposed surface of one principal-surface protection member adjacent to the one charge detecting electrode. The second intersection line is defined by the first imaginary plane and a third imaginary plane including an exposed surface of one side-surface protection member adjacent to the one charge detecting electrode. The second external terminal preferably extends from the other charge detecting electrode to the first intersection line as well as from the other charge detecting electrode to the second intersection line.

One embodiment of a method for manufacturing the first acceleration sensor comprises forming a piezoelectric-vibrating collective board including a plurality of rectangular element regions arranged in a two-dimensional matrix, which are to become a plurality of piezoelectric vibrating elements by cutting, the piezoelectric-vibrating collective board being formed by joining together polarized piezoelectric motherboards using an insulating adhesive; forming principal-surface spacer collective members, which are to become principal-surface spacer members by cutting, at positions, which are to become first longitudinal ends of the piezoelectric vibrating elements, on opposite principal surfaces of the piezoelectric-vibrating collective board; fixing principal-surface protection collective members, which are to become principal-surface protection members by cutting, to the respective principal-surface spacer collective members; cutting a collective body, constituted by the piezoelectric-vibrating collective board, the principal-surface spacer collective members, and the principal-surface protection collective members, along short sides of the element regions and dividing the collective body into first strip-shaped collective-board bodies in which long sides of the element regions are in a connected state; stacking the first collective-board bodies in a manner such that first longitudinal ends of sections that are to become the piezoelectric vibrating elements are flush with each other and second longitudinal ends of the sections are flush with each other; forming an end-surface spacer collective member, which is to become end-surface spacer members by cutting, on end surfaces at second longitudinal ends of the principal-surface protection collective members; fixing an end-surface protection collective member, which is to become end-surface protection members by cutting, to the end-surface spacer collective member; forming second collective-board bodies by cutting the plurality of first collective-board bodies and the end-surface protection collective member in the stacking direction along the long sides of the element regions and extension lines thereof; forming side-surface spacer collective members, which are to become side-surface spacer members by cutting, respectively on opposite side surfaces of the first longitudinal ends of the piezoelectric vibrating elements as well as on opposite side surfaces of pairs of principal-surface protection members, the end-surface protection collective member, pairs of principal-surface spacer members, and the end-surface spacer collective member in each second collective-board body; fixing side-surface protection collective members, which are to become side-surface protection members by cutting, respectively to the side-surface spacer collective members; obtaining individual acceleration sensor pieces by cutting the side-surface spacer collective members, the side-surface protection collective members, the end-surface spacer collective member, and the end-surface protection collective member along a plane at which the principal-surface protection members overlie each other; and forming an external terminal on an end surface at a first longitudinal end of each acceleration sensor piece.

In another embodiment, a method for manufacturing the second embodiment of the acceleration sensor above comprises forming a piezoelectric-vibrating collective board including a plurality of rectangular element regions arranged in a two-dimensional matrix, which are to become a plurality of piezoelectric vibrating elements by cutting, the piezoelectric-vibrating collective board being formed by joining together polarized piezoelectric motherboards using an insulating adhesive; forming principal-surface spacer collective members, which are to become principal-surface spacer members by cutting, at positions, which are to become first longitudinal ends of the piezoelectric vibrating elements, on opposite principal surfaces of the piezoelectric-vibrating collective board; fixing principal-surface protection collective members, which are to become principal-surface protection members by cutting, to the respective principal-surface spacer collective members; cutting a collective body, constituted by the piezoelectric-vibrating collective board, the principal-surface spacer collective members, and the principal-surface protection collective members, along long sides of the element regions and dividing the collective body into third collective-board bodies in which short sides of the element regions are in a connected state; stacking the third collective-board bodies in a manner such that first sides of sections, in a width direction orthogonal to a longitudinal direction thereof, which are to become the piezoelectric vibrating elements are flush with each other and second sides of the sections in the width direction are flush with each other; forming a pair of side-surface spacer collective members, which are to become pairs of side-surface spacer members by cutting, respectively on opposite side surfaces of the first longitudinal ends of the sections that are to become the piezoelectric vibrating elements as well as on opposite side surfaces of pairs of principal-surface protection collective members and pairs of principal-surface spacer members; fixing side-surface protection collective members, which are to become side-surface protection members by cutting, respectively to the side-surface spacer collective members; forming fourth collective-board bodies by cutting the third collective-board bodies and the side-surface protection collective members in the stacking direction along a short side of the element regions and an extension line thereof; forming an end-surface spacer collective member, which is to become end-surface spacer members by cutting, on end surfaces at second longitudinal ends of the principal-surface protection members, the side-surface spacer collective members, and the side-surface protection collective members in each fourth collective-board body; fixing an end-surface protection collective member, which is to become end-surface protection members by cutting, to the end-surface spacer collective member; obtaining individual acceleration sensor pieces by cutting the side-surface spacer collective members, the side-surface protection collective members, the end-surface spacer collective member, and the end-surface protection collective member along a plane at which the principal-surface protection members overlie each other; and forming an external terminal on an end surface at a first longitudinal end of each acceleration sensor piece.

One embodiment of a method for manufacturing the acceleration sensor according to the third embodiment above comprises forming a strip-shaped piezoelectric-vibrating collective board including a plurality of rectangular element regions arranged in a one-dimensional matrix in a longitudinal direction, which are to become a plurality of piezoelectric vibrating elements by cutting, the piezoelectric-vibrating collective board being formed by joining together polarized piezoelectric motherboards using an insulating adhesive; forming pairs of side-surface spacer members on opposite side surfaces of first longitudinal ends of sections that are to become the piezoelectric vibrating elements in the piezoelectric-vibrating collective board; forming a fifth collective-board body by preparing side-surface protection collective members, which are to become side-surface protection members by cutting and have the same thickness as the piezoelectric-vibrating collective board, and then fixing the side-surface protection collective members to the respective side-surface spacer members such that principal surfaces of the piezoelectric-vibrating collective board are flush with surfaces of the side-surface protection collective members; forming principal-surface spacer collective members, which are to become principal-surface spacer members by cutting, respectively on the opposite principal surfaces of the first longitudinal ends of the sections that are to become the piezoelectric vibrating elements in the piezoelectric-vibrating collective board as well as on opposite surfaces of the pair of side-surface protection collective members and the pairs of side-surface spacer members; fixing principal-surface protection collective members, which are to become principal-surface protection members by cutting, respectively to the principal-surface spacer collective members; cutting a collective body, constituted by the piezoelectric-vibrating collective board, the side-surface spacer members, the side-surface protection collective members, the principal-surface spacer collective members, and the principal-surface protection collective members, along a short side of the element regions and an extension line thereof from a principal-surface side of the sections that are to become the piezoelectric vibrating elements, and dividing the collective body into sixth collective-board bodies; arranging the sixth collective-board bodies such that first longitudinal ends of the piezoelectric vibrating elements are flush with each other and second longitudinal ends of the piezoelectric vibrating elements are flush with each other; forming an end-surface spacer collective member, which is to become end-surface spacer members by cutting, on end surfaces at second longitudinal ends of the principal-surface protection members and the side-surface protection members of the sixth collective-board bodies; fixing an end-surface protection collective member, which is to become end-surface protection members by cutting, to the end-surface spacer collective member; obtaining individual acceleration sensor pieces by cutting the end-surface spacer collective member and the end-surface protection collective member along a plane at which the principal-surface protection members overlie each other; and forming an external terminal on an end surface at a first longitudinal end of each acceleration sensor piece.

An embodiment of a method for manufacturing the acceleration sensor of the fourth embodiment above comprises forming a strip-shaped piezoelectric-vibrating collective board including a plurality of rectangular element regions arranged in a one-dimensional matrix in a longitudinal direction, which are to become a plurality of piezoelectric vibrating elements by cutting, the piezoelectric-vibrating collective board being formed by joining together polarized piezoelectric motherboards using an insulating adhesive; forming pairs of side-surface spacer members on opposite side surfaces of first longitudinal ends of sections that are to become the piezoelectric vibrating elements in the piezoelectric-vibrating collective board; forming a fifth collective-board body by preparing side-surface protection collective members, which are to become side-surface protection members by cutting and have the same thickness as the piezoelectric-vibrating collective board, and then fixing the side-surface protection collective members to the respective side-surface spacer members such that principal surfaces of the piezoelectric-vibrating collective board are flush with surfaces of the side-surface protection collective members; forming seventh collective-board bodies by cutting the fifth collective-board body along a short side of the element regions and an extension line thereof from a principal-surface side of the sections that are to become the piezoelectric vibrating elements; arranging the seventh collective-board bodies such that first principal surfaces of the piezoelectric vibrating elements are flush with each other and second principal surfaces of the piezoelectric vibrating elements are flush with each other and that first longitudinal ends of the piezoelectric vibrating elements are flush with each other and second longitudinal ends of the piezoelectric vibrating elements are flush with each other; forming an end-surface spacer collective member, which is to become end-surface spacer members by cutting, on end surfaces at second longitudinal ends of the side-surface protection members; preparing an end-surface protection collective member, which is to become end-surface protection members by cutting and has the same thickness as the piezoelectric vibrating elements, and fixing the end-surface protection collective member to the end-surface spacer collective member such that the principal surfaces of the piezoelectric vibrating elements are flush with the surfaces of the side-surface protection members and surfaces of the end-surface protection collective member; forming principal-surface spacer collective members, which are to become principal-surface spacer members by cutting, respectively on the opposite principal surfaces of the first longitudinal end of the piezoelectric vibrating elements as well as on opposite surfaces of the side-surface spacer members, the side-surface protection members, the end-surface spacer collective member, and the end-surface protection collective member; fixing principal-surface protection collective members, which are to become principal-surface protection members by cutting, to the principal-surface spacer collective members; obtaining individual acceleration sensor pieces by cutting the principal-surface spacer collective members, the principal-surface protection collective members, the end-surface spacer collective member, and the end-surface protection collective member along a plane at which the side-surface protection members overlie each other; and forming an external terminal on an end surface at a first longitudinal end of each acceleration sensor piece.

Since the acceleration sensor has a single-end support structure in which one longitudinal end of the piezoelectric vibrating element is supported by the pair of principal-surface spacer members respectively disposed on the opposite principal surfaces of the piezoelectric vibrating element, the piezoelectric vibrating element bends by a greater amount in response to acceleration, as compared with an acceleration sensor with a double-end support structure, whereby an acceleration sensor with high acceleration-detecting sensitivity can be achieved.

Furthermore, since a space for the piezoelectric vibrating element to vibrate in (referred to as "vibration space" hereinafter) is formed around the piezoelectric vibrating element by the pair of principal-surface spacer members, the pair of side-surface spacer members, and the end-surface spacer member or members, the size of the vibration space around the piezoelectric vibrating element can be easily set on the basis of the thicknesses of the pair of principal-surface spacer members, the pair of side-surface spacer members, and the end-surface spacer member or members. Therefore, the vibration space around the piezoelectric vibrating element can be easily set to a minimal size, thereby allowing for a compact acceleration sensor. In particular, although it is difficult to reduce the distance between the unsupported longitudinal end of the piezoelectric vibrating element and the inner wall surface of the casing in the acceleration sensor of the related art described above, the distance between the second longitudinal end of the piezoelectric vibrating element and the end-surface protection member can be easily set to a minimal or reduced size in the acceleration sensor described above on the basis of the thickness of the end-surface spacer member or members flush with the end surface at the second longitudinal end of the piezoelectric vibrating element.

Furthermore, since the vibration space is formed entirely around the piezoelectric vibrating element by the pair of principal-surface spacer members, the pair of side-surface spacer members, and the end-surface spacer member or members, recesses for forming the vibration space are not required in the pair of principal-surface protection members, the pair of side-surface protection members, and the end-surface protection member, thereby simplifying the shapes of these members. Accordingly, because the acceleration sensor can be constituted by simple-shaped components, a simple-structured and easy to manufacture acceleration sensor can be achieved.

Furthermore, since an external terminal is formed on the end surface at the first longitudinal end of the piezoelectric vibrating element, to which the charge detecting electrodes are extended, the arrangement of lead electrodes or the routing of electrode patterns for extending the charge detecting electrodes to the second end is not necessary, thereby allowing for size reduction as well as a simple structure for enabling easier manufacture.

In at least some of the above embodiments, the first external terminal extends from one charge detecting electrode towards one principal surface of the acceleration sensor that faces the corresponding principal surface of the piezoelectric vibrating element as well as towards one side surface of the acceleration sensor that is adjacent to the one principal surface and connected to one end surface of the acceleration sensor. On the other hand, the second external terminal extends from the other charge detecting electrode towards one principal surface of the acceleration sensor as well as towards one side surface of the acceleration sensor. Therefore, whether the acceleration sensor is mounted at the one principal surface or the one side surface, an electric signal from the piezoelectric vibrating element can be extracted via the external terminals. Consequently, the acceleration sensor can be disposed so that it can detect acceleration applied in a direction orthogonal or parallel to the mounting surface with a single terminal pattern.

With the above methods for manufacturing acceleration sensors, a plurality of compact, simple-structured, and easy to manufacture acceleration sensors with high acceleration-detecting sensitivity can be manufactured in a single manufacturing process.

BRIEF DESCRIPTION OF THE DRAWINGS

The object, the feature, and the advantages of the present invention will become more clarified by the detailed description below and the drawings.

FIG. 5 is a front view of the piezoelectric vibratory element;

FIG. 6 is a front view schematically showing the acceleration sensor shown in FIG. 1;

FIG. 9 is an external perspective view schematically showing an acceleration sensor according to a third embodiment;

FIGS. 14A and 14B are front views schematically showing other alternative embodiments of the acceleration sensor according to the first embodiment;

FIGS. 15A to 15L are perspective views showing a manufacturing process for a first acceleration sensor;

DETAILED DESCRIPTION

Certain embodiments as disclosed herein provide for an acceleration sensor with a single end support structure and a method for manufacturing the acceleration sensor.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Figure 1:
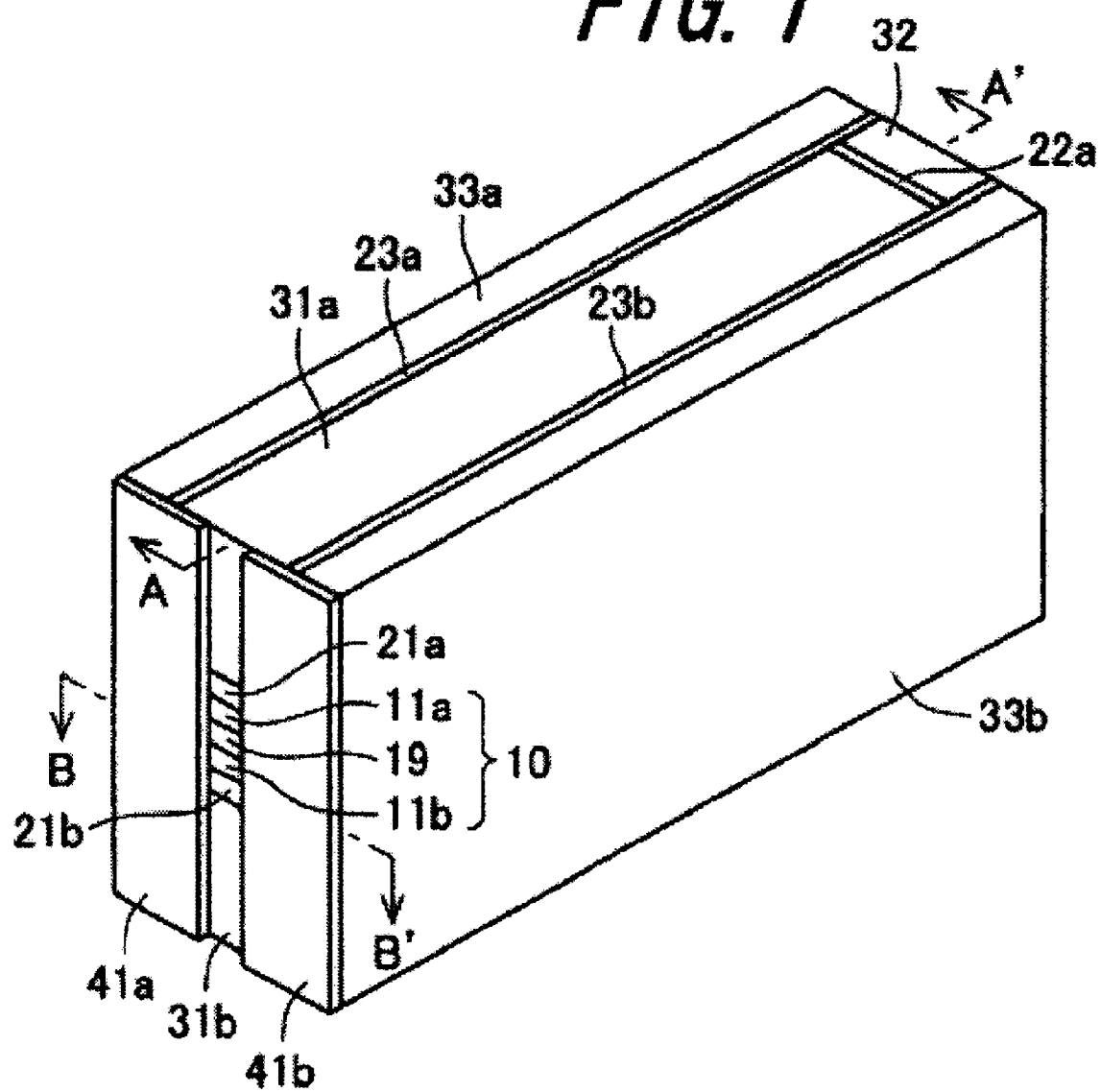
FIG. 1 is an external perspective view schematically showing an acceleration sensor according to a first embodiment.
Figure 2A:
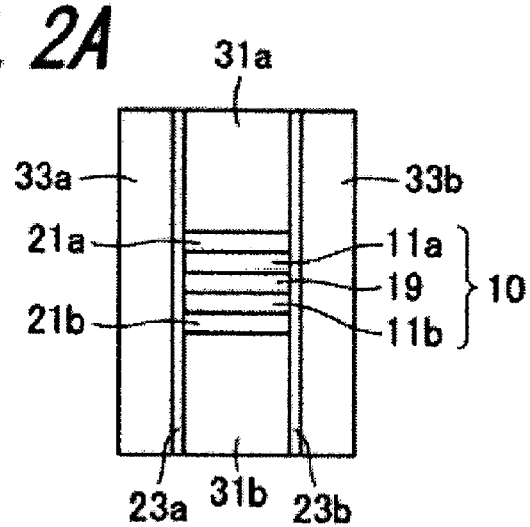
FIG. 2A is a front view schematically showing a state where external terminals are removed from the acceleration sensor shown in FIG. 1.
Figure 2B:
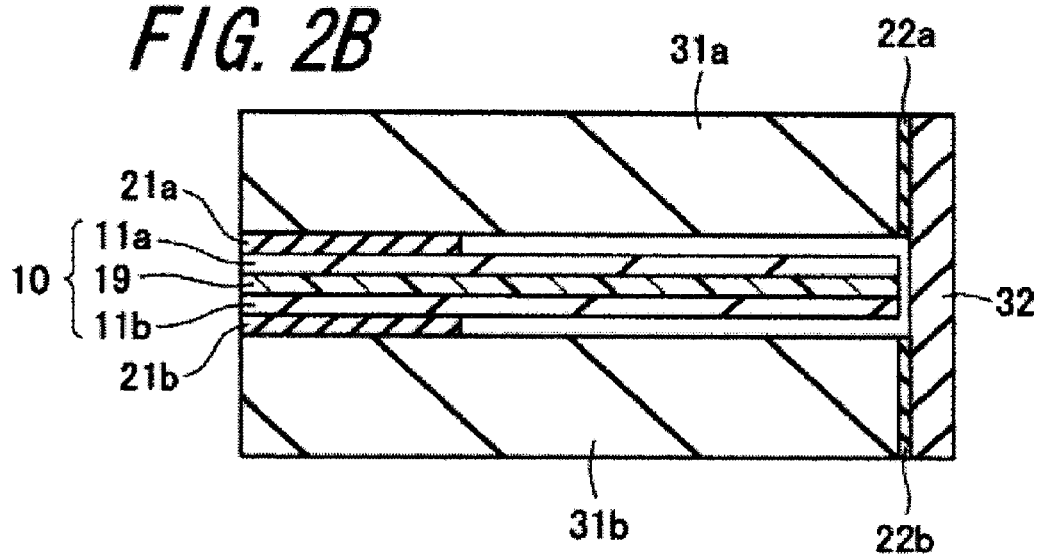
FIG. 2B is a cross-sectional view taken along line A-A' in FIG. 1.
Figure 2C:
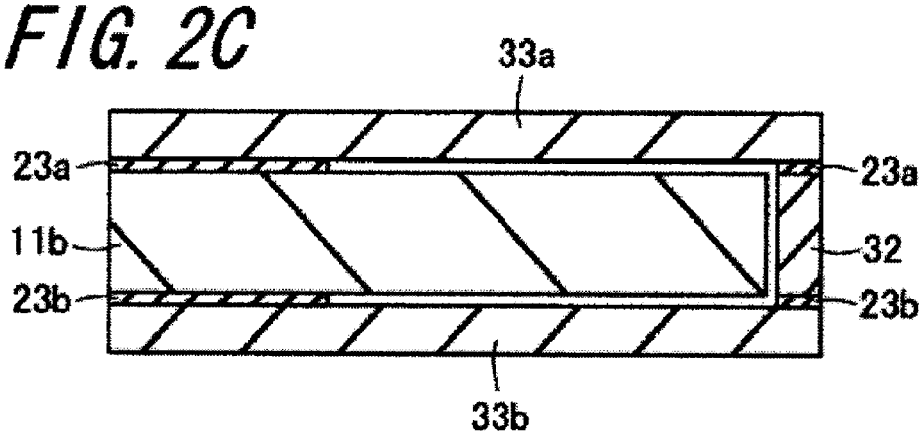
FIG. 2C is a cross-sectional view taken along line B-B' in FIG. 1.
Figure 3:
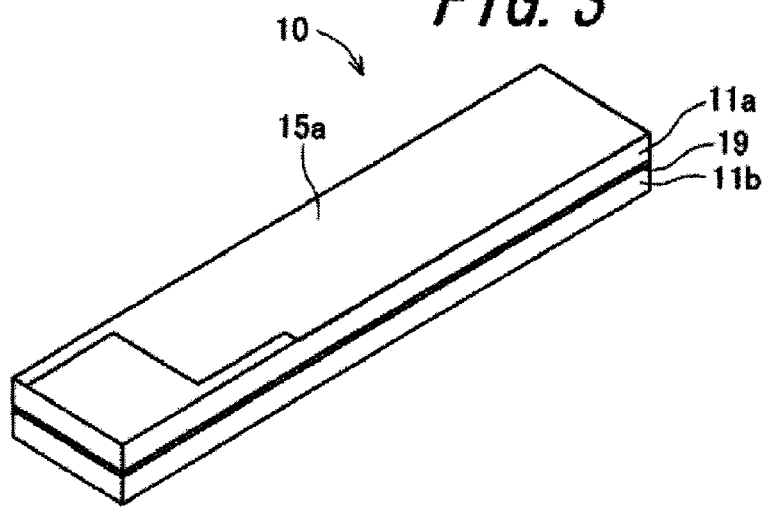
FIG. 3 is an external perspective view schematically showing a piezoelectric vibrating element in the acceleration sensor shown in FIG. 1.
Figure 4:
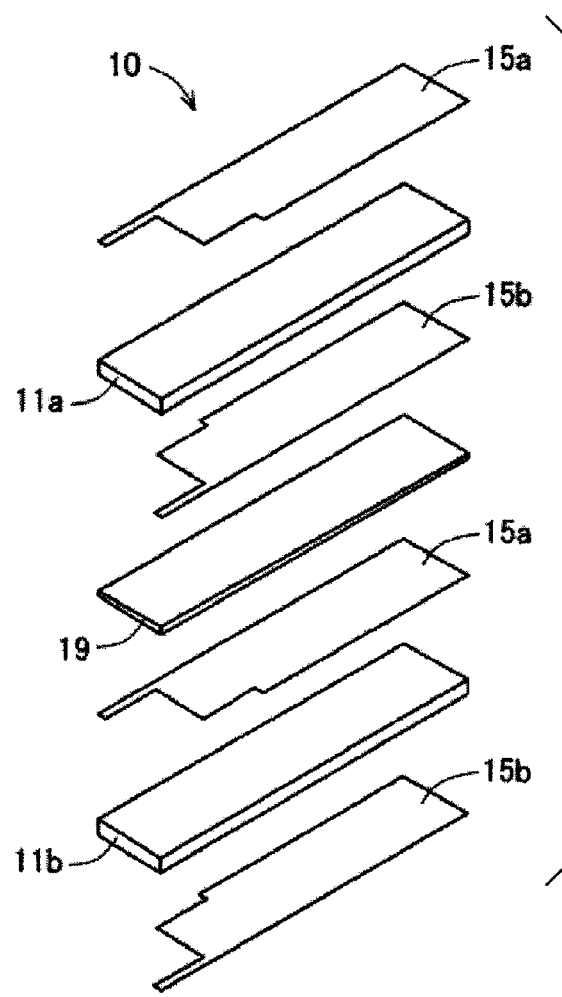
FIG. 4 is an exploded perspective view of the piezoelectric vibrating element shown in FIG. 3.

FIG. 1 is an external perspective view schematically showing an acceleration sensor according to a first embodiment. FIG. 2A is a front view schematically showing a state where external terminals 41a and 41b are removed from the acceleration sensor shown in FIG. 1. FIG. 2B is a cross-sectional view taken along line A-A' in FIG. 1. FIG. 2C is a cross-sectional view taken along line B-B' in FIG. 1. FIG. 3 is an external perspective view schematically showing a piezoelectric vibrating element in the acceleration sensor shown in FIG. 1. FIG. 4 is an exploded perspective view of the piezoelectric vibrating element shown in FIG. 3. FIG. 5 is a front view of the piezoelectric vibratory element. FIG. 6 is a front view schematically showing the acceleration sensor shown in FIG. 1. In FIG. 6, the external terminals 41a and 41b are hatched in order to provide an easier understanding of their positional relationship with charge detecting electrodes 15a and 15b.

As shown in FIG. 1 and FIGS. 2A to 2C, the acceleration sensor according to this embodiment includes a piezoelectric vibrating element 10, a pair of principal-surface spacer members 21a and 21b respectively disposed on opposite principal surfaces at a first longitudinal end of the piezoelectric vibrating element 10, and a pair of rectangular principal-surface protection members 31a and 31b whose end surfaces at first longitudinal ends and second longitudinal ends thereof are respectively flush with the end surfaces at the first longitudinal end and a second longitudinal end of the piezoelectric vibrating element 10. The pair of rectangular principal-surface protection members 31a and 31b is respectively spaced apart from the opposite principal surfaces of the piezoelectric vibrating element 10 by the pair of principal-surface spacer members 21a and 21b. Furthermore, the acceleration sensor according to this embodiment includes a pair of end-surface spacer members 22a and 22b disposed on the end surfaces at the second longitudinal ends of the pair of principal-surface protection members 31a and 31b, and an end-surface protection member 32 spaced apart from the end surfaces at the second longitudinal ends of the piezoelectric vibrating element 10 and the principal-surface protection members 31a and 31b by the end-surface spacer members 22a and 22b. Moreover, the acceleration sensor according to this embodiment includes a pair of annular side-surface spacer members 23a and 23b respectively disposed on opposite side surfaces of the first longitudinal end of the piezoelectric vibrating element 10 as well as on opposite side surfaces of the pair of principal-surface protection members 31a and 31b, the end-surface protection member 32, the pair of principal-surface spacer members 21a and 21b, and the pair of end-surface spacer members 22a and 22b, and a pair of side-surface protection members 33a and 33b respectively spaced apart from the opposite side surfaces of the piezoelectric vibrating element 10, the pair of principal-surface protection members 31a and 31b, the end-surface protection member 32, the pair of principal-surface spacer members 21a and 21b, and the pair of end-surface spacer members 22a and 22b by the pair of side-surface spacer members 23a and 23b. The opposite side surfaces of the piezoelectric vibrating element 10, the pair of principal-surface spacer members 21a and 21b, the pair of principal-surface protection members 31a and 31b, the pair of end-surface spacer members 22a and 22b, and the end-surface protection member 32 are respectively flush with each other.

In the acceleration sensor according to this embodiment, the piezoelectric vibrating element 10 is supported by having its opposite principal surfaces at the first longitudinal end sandwiched between the pair of principal-surface spacer members 21a and 21b and the pair of principal-surface protection members 31a and 31b, thereby achieving an acceleration sensor with a single-end support structure.

As shown in FIGS. 3 to 5, the piezoelectric vibrating element 10 in the acceleration sensor according to this embodiment is a piezoelectric vibrating element formed by stacking a pair of flat rectangular piezoelectric substrates 11a and 11b in the thickness direction, and has a structure in which the charge detecting electrodes 15a and 15b are respectively disposed on the opposite principal surfaces thereof. Furthermore, in the piezoelectric vibrating element 10 in the acceleration sensor according to this embodiment, charge detecting electrodes 15a and 15b are also disposed on opposing principal surfaces of the piezoelectric substrates 11a and 11b, and are stacked in the thickness direction with an insulating adhesive 19 therebetween. The charge detecting electrodes 15a and 15b on the opposite principal surfaces of each of the piezoelectric substrates 11a and 11b are disposed partially facing each other with the corresponding piezoelectric substrate 11a or 11b therebetween. The charge detecting electrodes 15a and 15b extend away from each other in the width direction to the end surface at the first longitudinal end of the piezoelectric vibrating element 10 and are respectively connected to the external terminals 41a and 41b shown in FIGS. 1 and 6. In this embodiment, the external terminals 41a and 41b are formed on the end surface at the first longitudinal end of the acceleration sensor such that they extend parallel to each other from one principal-surface protection member 31b towards the other principal-surface protection member 31a and are spaced apart from each other.

In the acceleration sensor according to this embodiment having such a structure, when acceleration having a component orthogonal to the principal surfaces of the piezoelectric vibrating element 10 is applied thereto, the piezoelectric vibrating element 10 bends in the thickness direction about a fulcrum defined by a section where it is supported by being sandwiched between the pair of principal-surface spacer members 21a and 21b. This causes the piezoelectric substrates 11a and 11b to warp and a piezoelectric effect to occur. An electric charge produced by the piezoelectric effect can be extracted by the charge detecting electrodes 15a and 15b. Because an electric signal according to the applied acceleration can be output to the outside in this manner via the external terminals 41a and 41b respectively connected to the charge detecting electrodes 15a and 15b, the acceleration sensor achieves its function. Consequently, since the external terminals 41a and 41b are formed on the end surface at the first longitudinal end of the piezoelectric vibrating element 10, to which the charge detecting electrodes 15a and 15b are extended, i.e., the end surface at the first longitudinal end of the acceleration sensor, the arrangement of lead electrodes or the routing of electrode patterns for extending the charge detecting electrodes 15a and 15b to the second end is not necessary, thereby allowing for size reduction as well as a simple structure for enabling easier manufacture.

When mounting the acceleration sensor to, for example, a circuit board, if the principal surfaces of the piezoelectric vibrating element 10 are set in parallel to the mounting surface, acceleration having a component orthogonal to the mounting surface can be detected, whereas if the principal surfaces of the piezoelectric vibrating element 10 are set orthogonally to the mounting surface, acceleration having a component parallel to the mounting surface and a component orthogonal to the principal surfaces of the piezoelectric vibrating element 10 can be detected.

In the acceleration sensor according to this embodiment, since the piezoelectric vibrating element 10 has a single-end support structure in which it is supported by having its opposite principal surfaces at the first longitudinal end sandwiched between the pair of principal-surface spacer members 21a and 21b and the pair of principal-surface protection members 31a and 31b, the piezoelectric vibrating element 10 bends by a greater amount, as compared with an acceleration sensor with a double-end support structure, whereby an acceleration sensor with high acceleration-detecting sensitivity can be achieved.

In the acceleration sensor according to this embodiment, since a vibration space, which is a space necessary for the piezoelectric vibrating element 10 to vibrate in, is formed around the piezoelectric vibrating element 10 by the pair of principal-surface spacer members 21a and 21b, the pair of end-surface spacer members 22a and 22b, and the pair of side-surface spacer members 23a and 23b, the size of the vibration space to be ensured around the piezoelectric vibrating element 10 can be easily set on the basis of the thicknesses of the pair of principal-surface spacer members 21a and 21b, the pair of end-surface spacer members 22a and 22b, and the pair of side-surface spacer members 23a and 23b. Therefore, the vibration space around the piezoelectric vibrating element 10 can be easily set to a small or minimal size, thereby allowing for a compact acceleration sensor. In particular, the distance between the second longitudinal end of the piezoelectric vibrating element 10 and the end-surface protection member 32 can be easily set on the basis of the thickness of the pair of end-surface spacer members 22a and 22b disposed on the end surfaces at the second longitudinal ends of the pair of principal-surface protection members 31a and 31b, which are flush with the end surface at the second longitudinal end of the piezoelectric vibrating element 10, whereby the distance can be set to a small or minimal size.

Furthermore, in the acceleration sensor according to this embodiment, since the vibration space is formed entirely around the piezoelectric vibrating element 10 by the pair of principal-surface spacer members 21a and 21b, the pair of end-surface spacer members 22a and 22b, and the pair of side-surface spacer members 23a and 23b, recesses for ensuring the vibration space are not required in the pair of principal-surface protection members 31a and 31b, the pair of side-surface protection members 33a and 33b, and the end-surface protection member 32, thereby simplifying the shapes of these members. In the acceleration sensor according to this embodiment shown in FIG. 1 and FIGS. 2A to 2C, the pair of principal-surface protection members 31a and 31b, the pair of side-surface protection members 33a and 33b, and the end-surface protection member 32 all have a flat rectangular shape, and the acceleration sensor can be constituted by simple-shaped components, including the piezoelectric vibrating element 10 also having a flat rectangular shape, thereby achieving an acceleration sensor that is simple-structured and easy to manufacture. Furthermore, by forming the pair of principal-surface spacer members 21a and 21b, the pair of end-surface spacer members 22a and 22b, and the pair of side-surface spacer members 23a and 23b using a cured adhesive, the acceleration sensor can be formed using only flat rectangular components and an adhesive, thereby achieving an acceleration sensor that is more simple-structured and easier to manufacture.

In the acceleration sensor according to this embodiment, the pair of piezoelectric substrates 11a and 11b are composed of a piezoelectric ceramic material, such as lead zirconate titanate or lead titanate, have a strip shape with, for example, a length of about 0.5 mm to 5 mm, a width of about 0.2 mm to 1 mm, and a thickness of about 0.1 mm to 1 mm, and are polarized in the thickness direction. Such piezoelectric substrates 11a and 11b can each be fabricated by first forming sheets by, for example, a method of adding a binder to raw powder and pressing them or by a method of mixing raw powder with water or a dispersant using a ball mill, dehydrating the mixture, adding a binder, a solvent, a plasticizer, etc. thereto, and then shaping using a doctor blade. The sheets are then stacked and pressed where necessary, and are subsequently baked at a peak temperature of, for example, about 1100° C. to 1400° C., thereby forming a substrate. Then, a polarization process is performed on the substrate by applying a voltage of about 3 kV/mm to 15 kV/mm thereto in the thickness direction thereof at a temperature of, for example, about 60° C. to 150° C.

The charge detecting electrodes 15a and 15b are composed of a metallic material with good conductivity, such as gold, silver, copper, chromium, nickel, tin, lead, or aluminum, and are each given a thickness of, for example, about 0.1 μm to 3 μm. The charge detecting electrodes 15a and 15b are formed such that they partially face each other with the corresponding piezoelectric substrate 11a or 11b therebetween. Such charge detecting electrodes 15a and 15b can be formed by coating the opposite principal surfaces of each of the piezoelectric substrates 11a and 11b with a metallic material by a commonly-known vacuum deposition or sputtering technique, or by applying a predetermined conductive paste containing the aforementioned metallic material to a predetermined pattern by a commonly-known printing technique and then baking it at high temperature.

The insulating adhesive 19 may be composed of an insulating material, such as glass-fabric-base epoxy resin, inorganic glass, or epoxy resin. For example, when using glass-fabric-base epoxy resin, which is a prepreg material formed by impregnating glass fibers with epoxy resin, the glass-fabric-base epoxy resin may be sandwiched between the pair of piezoelectric substrates 11a and 11b each including the charge detecting electrodes 15a and 15b on the opposite principal surfaces thereof. By heating while pressurizing, the epoxy resin may then be compressed to a predetermined thickness and cured. When using inorganic glass, a glass paste may be applied, by printing, between the pair of piezoelectric substrates 11a and 11b, each including the charge detecting electrodes 15a and 15b on the opposite principal surfaces thereof, so as to form a laminate. Subsequently, while applying a load on the laminate, the laminate may be fused by using a baking furnace. The peak temperature in the baking furnace may be about 300° C. to 700° C. Alternatively, by performing the baking using a vacuum furnace, the glass can be prevented from intrusion of bubbles. However, when performing the joining process at a temperature of 300° C. or higher, the piezoelectric substrates 11a and 11b lose their polarization. Therefore, it is necessary to perform the polarization process again after the joining process.

The pair of principal-surface spacer members 21a and 21b, the pair of end-surface spacer members 22a and 22b, and the pair of side-surface spacer members 23a and 23b have a function of forming a vibration space around the piezoelectric vibrating element 10 and defining the size of the vibration space with their thicknesses. Although their thicknesses are appropriately set in accordance with, for example, the level of necessity for size reduction of the acceleration sensor and the achievable dimensional accuracy, in the acceleration sensor according to this embodiment, the distance between the opposite principal surfaces of the piezoelectric vibrating element 10 and the respective principal-surface protection members 31a and 31b is determined by the pair of principal-surface spacer members 21a and 21b disposed only at the first longitudinal end of the piezoelectric vibrating element 10. In light of this, in the acceleration sensor according to this embodiment, it is desirable that the thickness of the pair of principal-surface spacer members 21a and 21b be set larger than the thicknesses of the pair of end-surface spacer members 22a and 22b and the pair of side-surface spacer members 23a and 23b, so that the vibration space on the exterior of the opposite principal surfaces of the piezoelectric vibrating element 10 can be properly formed and the acceleration sensor can be reduced in size. Furthermore, in the acceleration sensor according to this embodiment, because the piezoelectric vibrating element 10 bends and vibrates in the thickness direction in response to acceleration applied to the acceleration sensor, the required vibration space is larger in the thickness direction of the piezoelectric vibrating element 10 than in the longitudinal direction and the width direction thereof. Therefore, it is desirable that the thickness of the pair of principal-surface spacer members 21a and 21b be set larger than the thicknesses of the pair of end-surface spacer members 22a and 22b and the pair of side-surface spacer members 23a and 23b, so that the desired vibration space on the exterior of the opposite principal surfaces of the piezoelectric vibrating element 10 can be formed and the acceleration sensor can be reduced in size. Thus, the pair of principal-surface spacer members 21a and 21b are given a thickness of, for example, about 60 μm to 100 μm, and the pair of end-surface spacer members 22a and 22b and the pair of side-surface spacer members 23a and 23b are given a thickness of, for example, about 20 μm to 50 μm. In order to properly ensure the vibration space on the exterior of the opposite principal surfaces of the piezoelectric vibrating element 10 and to securely support the opposite principal surfaces of the piezoelectric vibrating element 10, it is preferable that, for example, the pair of principal-surface spacer members 21a and 21b be formed on the opposite principal surfaces over a range of about 0.5 mm to 1 mm from the first longitudinal end of the piezoelectric vibrating element 10. In addition, by setting the elastic coefficient of the principal-surface spacer members 21a and 21b smaller than the elastic coefficient of the principal-surface protection members 31a and 31b, the piezoelectric vibrating element 10 can bend easily in an area where it is sandwiched between the pair of principal-surface spacer members 21a and 21b. Consequently, since the warping areas of the pair of piezoelectric substrates 11a and 11b increase, the acceleration-detecting sensitivity can be enhanced.

Although an insulating material, such as various kinds of ceramic materials or synthetic resin, may be used as the pair of principal-surface spacer members 21a and 21b, the pair of end-surface spacer members 22a and 22b, and the pair of side-surface spacer members 23a and 23b, the manufacturing process can be significantly simplified by using an insulating adhesive. In particular, by using a prepreg material formed by impregnating carbon fibers or glass fibers with resin or by using a semi-cured (B-stage) adhesive, the vibration space with a desired size can be easily formed around the piezoelectric vibrating element 10. For example, when using a thermosetting epoxy-based adhesive, the adhesive may be applied to a bonding surface of one joint member by printing and be held for about one to two hours at a temperature of about 50° C. to 70° C. until it is semi-cured. Then, another joint member may be bonded, and the distance between the two members may be adjusted where necessary. Subsequently, the two members may be held for one to two hours at a temperature of about 100° C. to 200° C. until the adhesive is fully cured.

The pair of principal-surface protection members 31a and 31b, the end-surface protection member 32, and the pair of side-surface protection members 33a and 33b have a function of forming the vibration space, defined by the thicknesses of the pair of principal-surface spacer members 21a and 21b, the pair of end-surface spacer members 22a and 22b, and the pair of side-surface spacer members 23a and 23b, around the piezoelectric vibrating element 10 and protecting the piezoelectric vibrating element 10. Moreover, since the pair of principal-surface protection members 31a and 31b also have a function of supporting the opposite principal surfaces of the piezoelectric vibrating element 10 with the pair of principal-surface spacer members 21a and 21b therebetween, it is desirable that the pair of principal-surface protection members 31a and 31b have a thickness larger than those of the pair of side-surface protection members 33a and 33b and the end-surface protection member 32. This allows the piezoelectric vibrating element 10 to be securely supported while the acceleration sensor can be reduced in size as much as possible. Consequently, the pair of principal-surface protection members 31a and 31b are given a thickness of, for example, about 0.6 mm to 0.8 mm, and the pair of side-surface protection members 33a and 33b and the end-surface protection member 32 are given a thickness of, for example, about 0.15 mm to 0.2 mm.

Although an insulating material, such as various kinds of ceramic materials or synthetic resin, may be used as the principal-surface protection members 31a and 31b, the end-surface protection member 32, and the side-surface protection members 33a and 33b, it is desirable that epoxy-based resin with good insulating, moisture-resistant, heat-resistant, and adhesive properties be used. For example, EPOX (registered trademark) manufactured by Mitsui Chemicals, Inc. may be suitably used.

As the external terminals 41a and 41b, a conductive adhesive containing a conductive filler in resin, for example, may be used. The conductive filler may be a material having good conductivity, such as silver or copper. Adhesive resin in a conductive adhesive is desirably a material that is curable below 300° C. in order to prevent the piezoelectric substrates 11 from losing their polarization. For example, epoxy-based resin may be suitably used.

Figure 7:
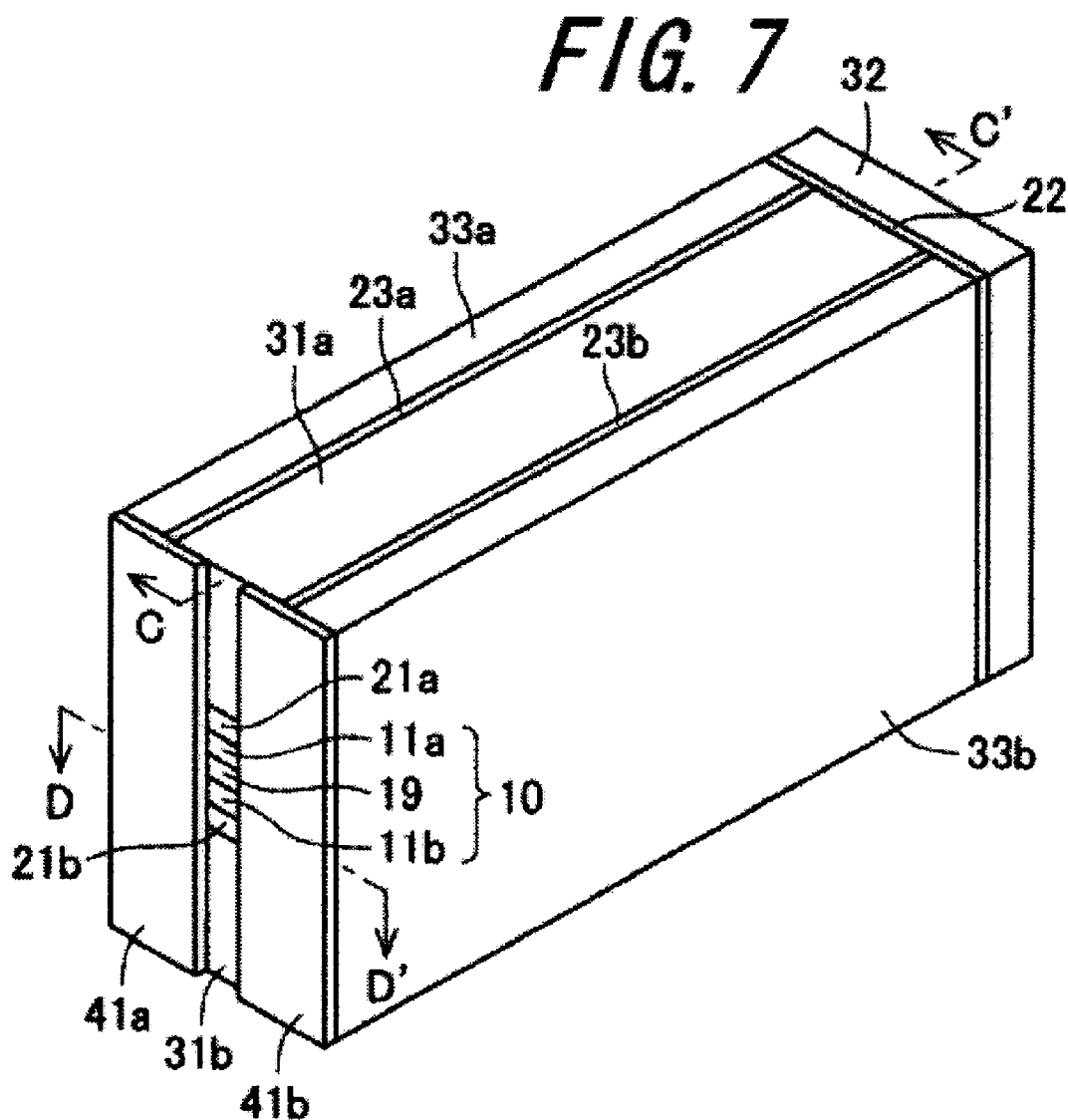
FIG. 7 is an external perspective view schematically showing an acceleration sensor according to a second embodiment.
Figure 8A:
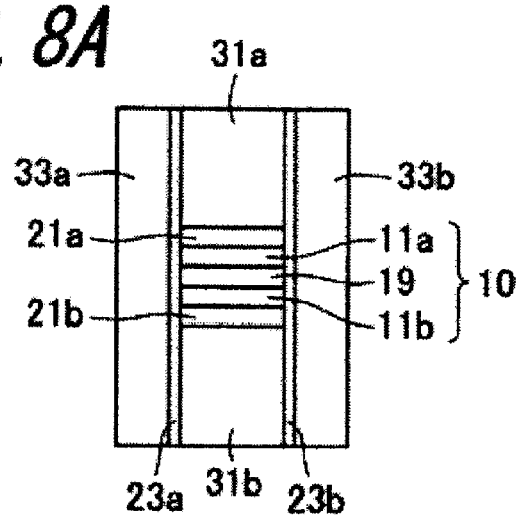
FIG. 8A is a front view schematically showing a state where the external terminals are removed from the acceleration sensor shown in FIG. 7.
Figure 8B:
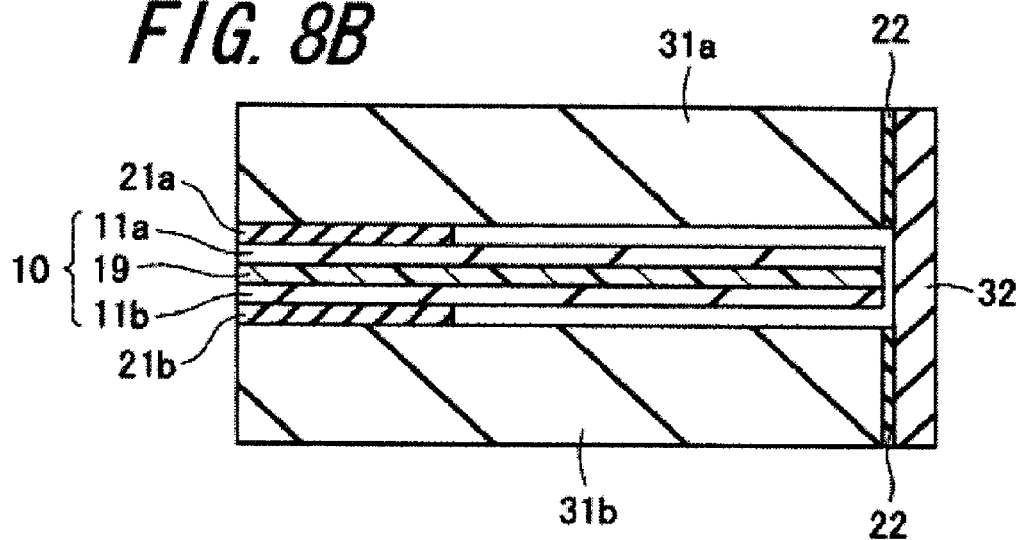
FIG. 8B is a cross-sectional view taken along line C-C' in FIG. 7.
Figure 8C:
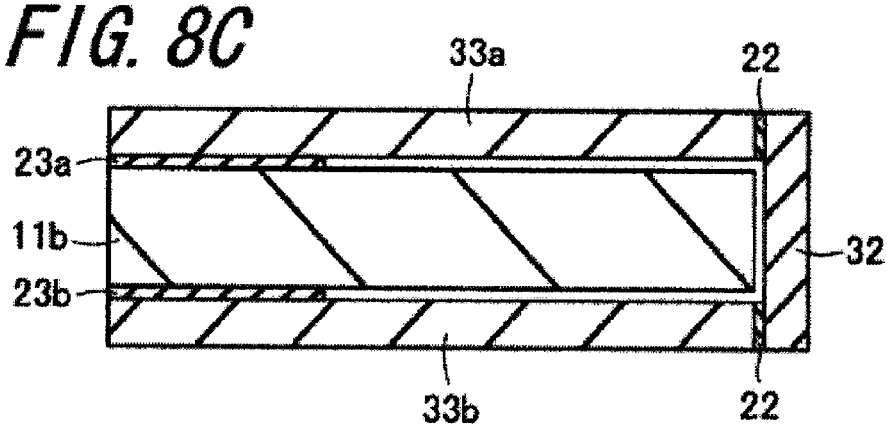
FIG. 8C is a cross-sectional view taken along line D-D' in FIG. 7.

FIG. 7 is an external perspective view schematically showing an acceleration sensor according to a second embodiment. FIG. 8A is a front view schematically showing a state where the external terminals 41a and 41b are removed from the acceleration sensor shown in FIG. 7. FIG. 8B is a cross-sectional view taken along line C-C' in FIG. 7. FIG. 8C is a cross-sectional view taken along line D-D' in FIG. 7. In this embodiment, only the basic configuration is described. Components similar to those in the first embodiment are given the same reference numerals, and repetitive descriptions thereof are omitted.

As shown in FIG. 7 and FIGS. 8A to 8C, the acceleration sensor according to this embodiment includes a piezoelectric vibrating element 10, a pair of principal-surface spacer members 21a and 21b respectively disposed on opposite principal surfaces at a first longitudinal end of the piezoelectric vibrating element 10, and a pair of rectangular principal-surface protection members 31a and 31b whose end surfaces at first longitudinal ends and second longitudinal ends thereof are respectively flush with the end surfaces at the first longitudinal end and a second longitudinal end of the piezoelectric vibrating element 10. The rectangular principal-surface protection members 31a and 31b are respectively spaced apart from the opposite principal surfaces of the piezoelectric vibrating element 10 by the pair of principal-surface spacer members 21a and 21b. Furthermore, the acceleration sensor according to this embodiment includes a pair of side-surface spacer members 23a and 23b respectively disposed on opposite side surfaces of the first longitudinal end of the piezoelectric vibrating element 10 as well as on opposite side surfaces of the pair of principal-surface protection members 31a and 31b and the pair of principal-surface spacer members 21a and 21b, and a pair of rectangular side-surface protection members 33a and 33b respectively spaced apart from the opposite side surfaces of the piezoelectric vibrating element 10, the pair of principal-surface protection members 31a and 31b, and the pair of principal-surface spacer members 21a and 21b by the pair of side-surface spacer members 23a and 23b. The end surfaces at first longitudinal ends and second longitudinal ends of the side-surface protection members 33a and 33b are respectively flush with the end surfaces at the first longitudinal end and the second longitudinal end of the piezoelectric vibrating element 10. Moreover, the acceleration sensor according to this embodiment includes an annular end-surface spacer member 22 disposed on the end surfaces at the second longitudinal ends of the pair of principal-surface protection members 31a and 31b and the pair of side-surface protection members 33a and 33b, and an end-surface protection member 32 spaced apart from the end surfaces at the second longitudinal ends of the piezoelectric vibrating element 10, the pair of principal-surface protection members 31a and 31b, and the pair of side-surface protection members 33a and 33b by the end-surface spacer member 22. The opposite side surfaces of the piezoelectric vibrating element 10, the pair of principal-surface spacer members 21a and 21b, and the pair of principal-surface protection members 31a and 31b are respectively flush with each other.

The acceleration sensor according to this embodiment having such a structure is similar to the acceleration sensor according to the first embodiment described above in that it has a single-end support structure, and therefore has high acceleration-detecting sensitivity by the piezoelectric vibrating element 10. In addition, since the vibration space is formed around the piezoelectric vibrating element 10 by the pair of principal-surface spacer members 21a and 21b, the end-surface spacer member 22, and the pair of side-surface spacer members 23a and 23b, size reduction can be achieved. Moreover, since recesses for ensuring the vibration space are not required in the pair of principal-surface protection members 31a and 31b, the pair of side-surface protection members 33a and 33b, and the end-surface protection member 32, a simple-structured and easy to manufacture acceleration sensor can be achieved.

Figure 10A:
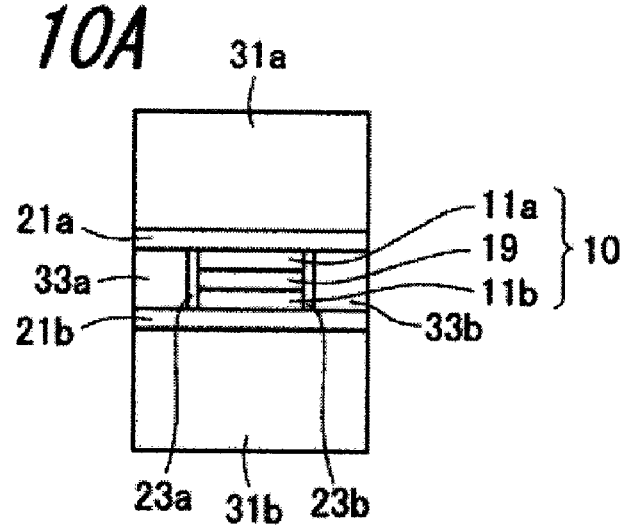
FIG. 10A is a front view schematically showing a state where the external terminals are removed from the acceleration sensor shown in FIG. 9.
Figure 10B:
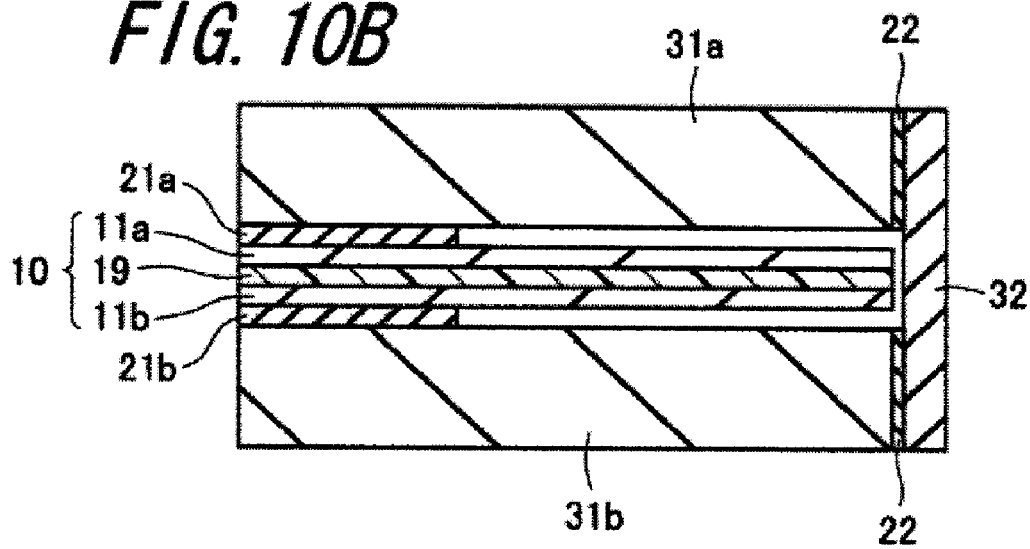
FIG. 10B is a cross-sectional view taken along line E-E' in FIG. 9.
Figure 10C:
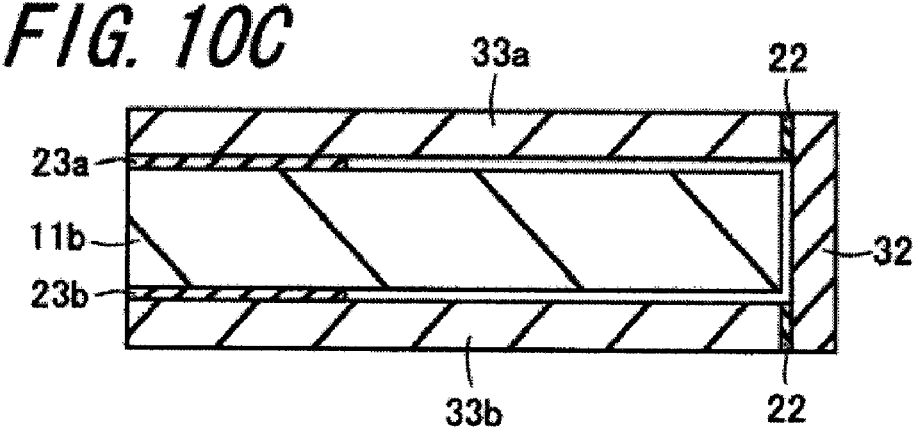
FIG. 10C is a cross-sectional view taken along line F-F' in FIG. 9.

FIG. 9 is an external perspective view schematically showing an acceleration sensor according to a third embodiment. FIG. 10A is a front view schematically showing a state where the external terminals 41a and 41b are removed from the acceleration sensor shown in FIG. 9. FIG. 10B is a cross-sectional view taken along line E-E' in FIG. 9. FIG. 10C is a cross-sectional view taken along line F-F' in FIG. 9. In this embodiment, only the basic configuration is described. Components similar to those in the first and second embodiments are given the same reference numerals, and repetitive descriptions thereof are omitted.

As shown in FIG. 9 and FIGS. 10A to 10C, the acceleration sensor according to this embodiment includes a piezoelectric vibrating element 10, a pair of side-surface spacer members 23a and 23b respectively disposed on opposite side surfaces of a first longitudinal end of the piezoelectric vibrating element 10, and a pair of rectangular side-surface protection members 33a and 33b whose end surfaces at first longitudinal ends and second longitudinal ends thereof are respectively flush with the end surfaces at the first longitudinal end and a second longitudinal end of the piezoelectric vibrating element 10. The pair of rectangular side-surface protection members 33a and 33b are respectively spaced apart from the opposite side surfaces of the piezoelectric vibrating element 10 by the pair of side-surface spacer members 23a and 23b. Furthermore, the acceleration sensor according to this embodiment includes a pair of principal-surface spacer members 21a and 21b respectively disposed on the opposite principal surfaces at the first longitudinal end of the piezoelectric vibrating element 10 as well as on opposite surfaces, adjacent to the opposite principal surfaces, of the pair of side-surface protection members 33a and 33b and the pair of side-surface spacer members 23a and 23b, and a pair of rectangular principal-surface protection members 31a and 31b whose end surfaces at first longitudinal ends and second longitudinal ends thereof are respectively flush with the end surfaces at the first longitudinal end and the second longitudinal end of the piezoelectric vibrating element 10. The pair of rectangular principal-surface protection members 31a and 31b are respectively spaced apart from the opposite principal surfaces of the piezoelectric vibrating element 10 as well as from the opposite surfaces, adjacent to the opposite principal surfaces, of the pair of side-surface protection members 33a and 33b and the pair of side-surface spacer members 23a and 23b by the pair of principal-surface spacer members 21a and 21b. The opposite principal surfaces of the piezoelectric vibrating element 10 are respectively flush with the opposite surfaces, adjacent to the opposite principal surfaces, of the pair of side-surface protection members 33a and 33b and the pair of side-surface spacer members 23a and 23b. Moreover, the acceleration sensor according to this embodiment includes an annular end-surface spacer member 22 disposed on the end surfaces at the second longitudinal ends of the pair of principal-surface protection members 31a and 31b and the pair of side-surface protection members 33a and 33b, and an end-surface protection member 32 spaced apart from the end surfaces at the second longitudinal ends of the piezoelectric vibrating element 10, the pair of principal-surface protection members 31a and 31b, and the pair of side-surface protection members 33a and 33b by the end-surface spacer member 22.

The acceleration sensor according to this embodiment having such a structure is similar to the acceleration sensor according to the first and second embodiments described above in that it has a single-end support structure, and therefore has high acceleration-detecting sensitivity by the piezoelectric vibrating element 10. In addition, since the vibration space is formed around the piezoelectric vibrating element 10 by the pair of principal-surface spacer members 21a and 21b, the end-surface spacer member 22, and the pair of side-surface spacer members 23a and 23b, size reduction can be achieved. Moreover, since recesses for ensuring the vibration space are not required in the pair of principal-surface protection members 31a and 31b, the pair of side-surface protection members 33a and 33b, and the end-surface protection member 32, a simple-structured and easy to manufacture acceleration sensor can be achieved.

In the acceleration sensor according to this embodiment, the pair of principal-surface spacer members 21a and 21b are not only disposed on the opposite principal surfaces at the first longitudinal end of the piezoelectric vibrating element 10, but are also respectively disposed on the opposite surfaces of the side-surface protection members 33a and 33b adjacent to these opposite principal surfaces so as to extend entirely in the longitudinal direction of the piezoelectric vibrating element 10. In addition, the opposite surfaces of the pair of side-surface protection members 33a and 33b on which the pair of principal-surface spacer members 21a and 21b are disposed are respectively flush with the opposite principal surfaces of the piezoelectric vibrating element 10. Consequently, since the vibration space corresponding to the thickness of the pair of principal-surface spacer members 21a and 21b can be properly formed in the entire longitudinal direction on the exterior of the opposite principal surfaces of the piezoelectric vibrating element 10, a vibration space on the exterior of the opposite principal surfaces of the piezoelectric vibrating element 10 can be easily and properly formed in the direction in which the piezoelectric vibrating element 10 bends and vibrates in response to applied acceleration.

Figure 11:
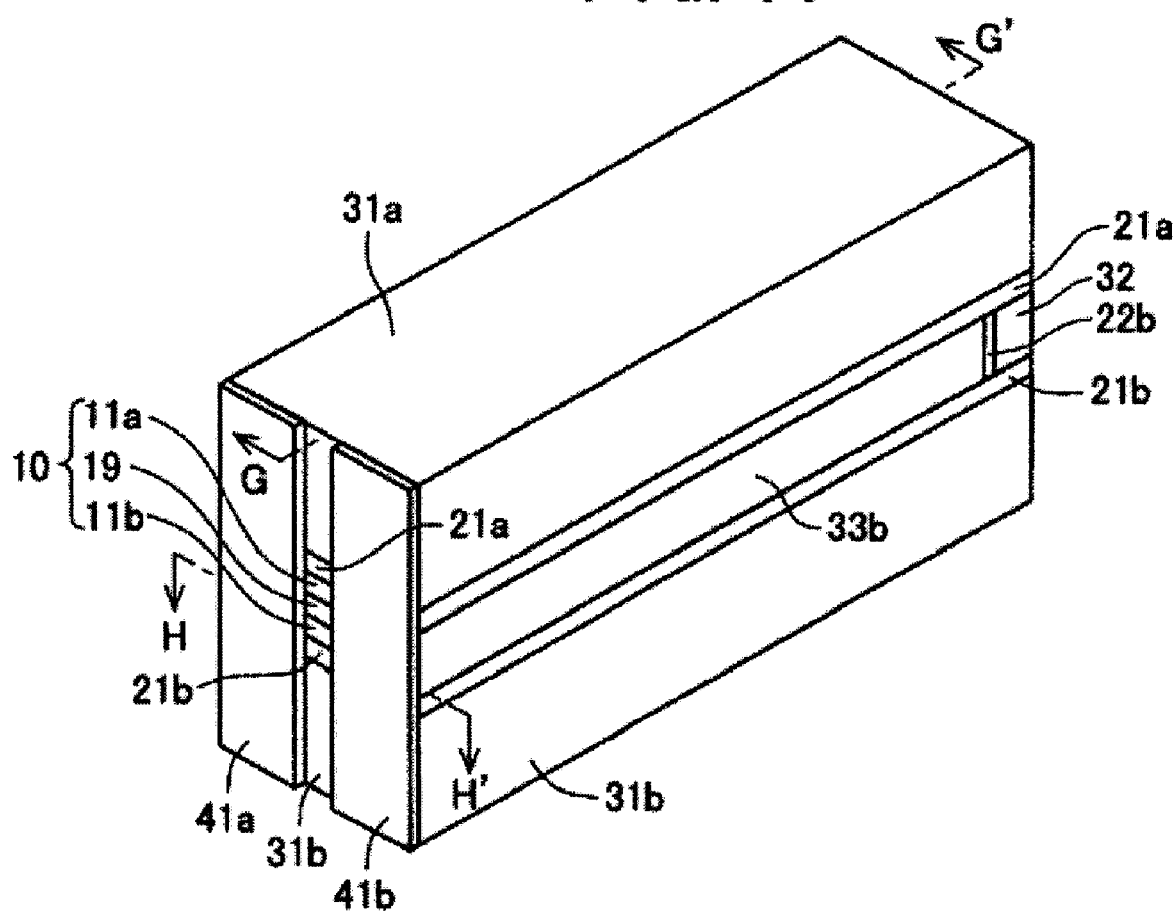
FIG. 11 is an external perspective view schematically showing an acceleration sensor according to a fourth embodiment.
Figure 12A:
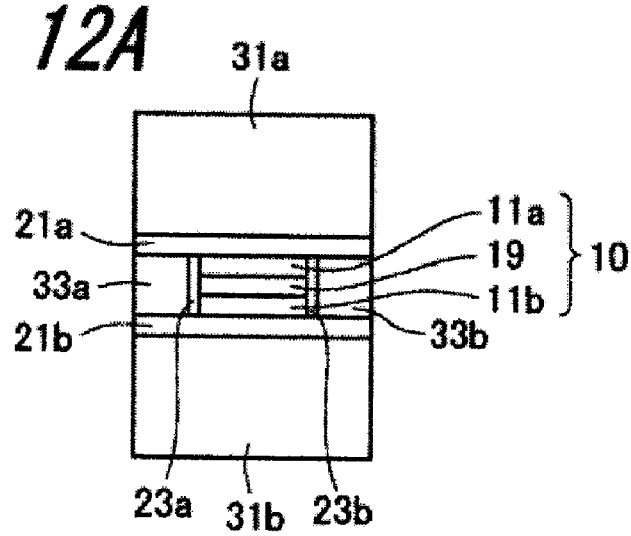
FIG. 12A is a front view schematically showing a state where the external terminals 41 and 41 are removed from the acceleration sensor shown in FIG. 11.
Figure 12B:
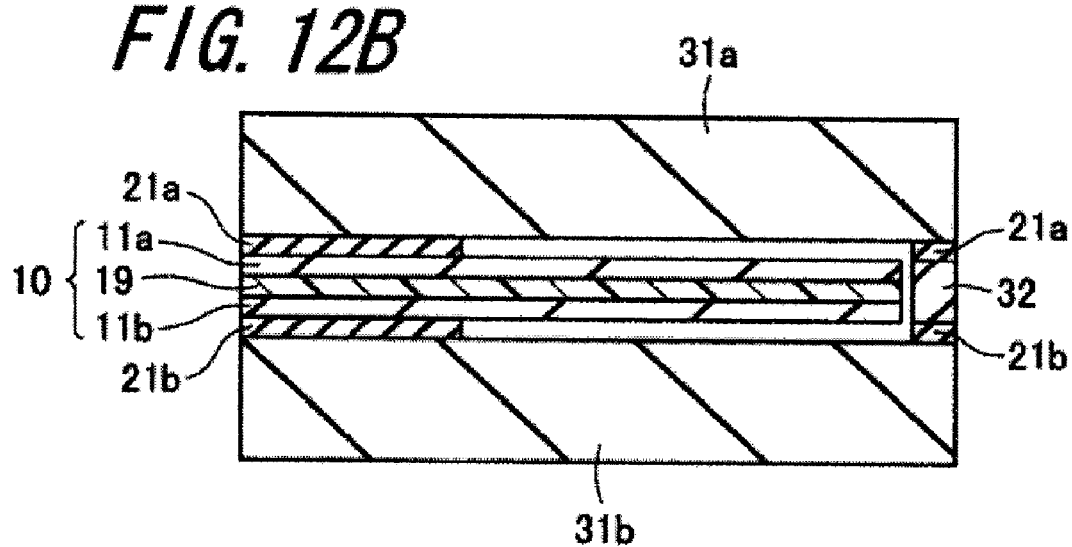
FIG. 12B is a cross-sectional view taken along line G-G' in FIG. 11.
Figure 12C:
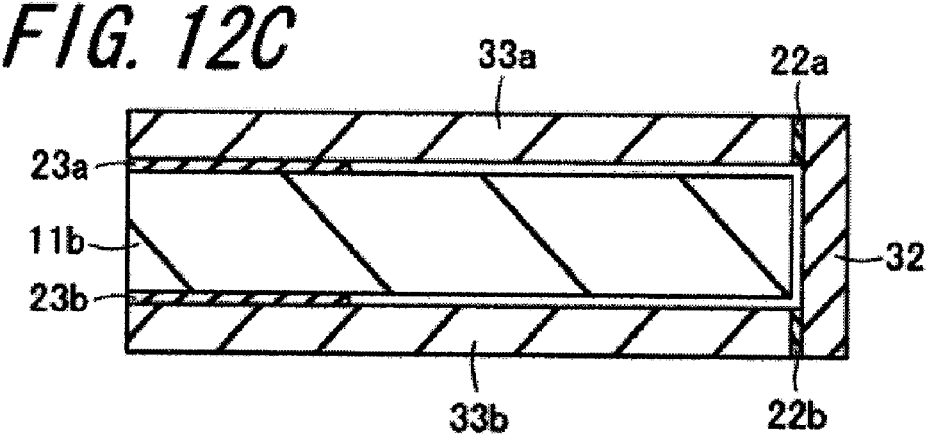
FIG. 12C is a cross-sectional view taken along line H-H' in FIG. 11.

FIG. 11 is an external perspective view schematically showing an acceleration sensor according to a fourth embodiment. FIG. 12A is a front view schematically showing a state where the external terminals 41a and 41b are removed from the acceleration sensor shown in FIG. 11. FIG. 12B is a cross-sectional view taken along line G-G' in FIG. 11. FIG. 12C is a cross-sectional view taken along line H-H' in FIG. 11. In this embodiment, only the basic configuration is described. Components similar to those in the first to third embodiments are given the same reference numerals, and repetitive descriptions thereof are omitted.

As shown in FIG. 11 and FIGS. 12A to 12C, the acceleration sensor according to this embodiment includes a piezoelectric vibrating element 10, a pair of side-surface spacer members 23a and 23b respectively disposed on opposite side surfaces of a first longitudinal end of the piezoelectric vibrating element 10, and a pair of rectangular side-surface protection members 33a and 33b whose end surfaces at first longitudinal ends and second longitudinal ends thereof are respectively flush with the end surfaces at the first longitudinal end and a second longitudinal end of the piezoelectric vibrating element 10. The pair of rectangular side-surface protection members 33a and 33b are respectively spaced apart from the opposite side surfaces of the piezoelectric vibrating element 10 by the pair of side-surface spacer members 23a and 23b. Furthermore, the acceleration sensor according to this embodiment includes a pair of end-surface spacer members 22a and 22b respectively disposed on the end surfaces at the second longitudinal ends of the pair of side-surface protection members 33a and 33b, and an end-surface protection member 32 spaced apart from the end surfaces at the second longitudinal ends of the piezoelectric vibrating element 10 and the pair of side-surface protection members 33a and 33b by the end-surface spacer members 22a and 22b. Moreover, the acceleration sensor according to this embodiment includes a pair of annular principal-surface spacer members 21a and 21b respectively disposed on the opposite principal surfaces at the first longitudinal end of the piezoelectric vibrating element 10 as well as on opposite surfaces, adjacent to these opposite principal surfaces, of the pair of side-surface protection members 33a and 33b, the end-surface protection member 32, the pair of side-surface spacer members 23a and 23b, and the pair of end-surface spacer members 22a and 22b, and a pair of rectangular principal-surface protection members 31a and 31b spaced apart from the opposite principal surfaces of the piezoelectric vibrating element 10 as well as from the opposite surfaces, adjacent to these opposite principal surfaces, of the pair of side-surface protection members 33a and 33b, the end-surface protection member 32, the pair of side-surface spacer members 23a and 23b, and the pair of end-surface spacer members 22a and 22b by the pair of principal-surface spacer members 21a and 21b.

The acceleration sensor according to this embodiment having such a structure is similar to the acceleration sensor according to the first to third embodiments in that it has a single-end support structure, and therefore has high acceleration-detecting sensitivity by the piezoelectric vibrating element 10. In addition, since the vibration space is formed around the piezoelectric vibrating element 10 by the pair of principal-surface spacer members 21a and 21b, the pair of end-surface spacer members 22a and 22b, and the pair of side-surface spacer members 23a and 23b, size reduction can be achieved. Moreover, since recesses for forming the vibration space are not required in the pair of principal-surface protection members 31a and 31b, the pair of side-surface protection members 33a and 33b, and the end-surface protection member 32, a simple-structured and easy to manufacture acceleration sensor can be achieved.

In the acceleration sensor according to this embodiment, the pair of principal-surface spacer members 21a and 21b are not only disposed on the opposite principal surfaces at the first longitudinal end of the piezoelectric vibrating element 10, but are also respectively disposed entirely over the opposite surfaces, adjacent to these opposite principal surfaces, of the pair of side-surface protection members 33a and 33b and the end-surface protection member 32. In addition, the opposite surfaces of the pair of side-surface protection members 33a and 33b and the end-surface protection member 32 on which the pair of principal-surface spacer members 21a and 21b are disposed are respectively flush with the opposite principal surfaces of the piezoelectric vibrating element 10. Consequently, since the vibration space corresponding to the thickness of the pair of principal-surface spacer members 21a and 21b can be formed in the entire longitudinal direction on the exterior of the opposite principal surfaces of the piezoelectric vibrating element 10, a vibration space on the exterior of the opposite principal surfaces of the piezoelectric vibrating element 10 can be easily formed in the direction in which the piezoelectric vibrating element 10 bends and vibrates in response to applied acceleration.

Figure 13A:
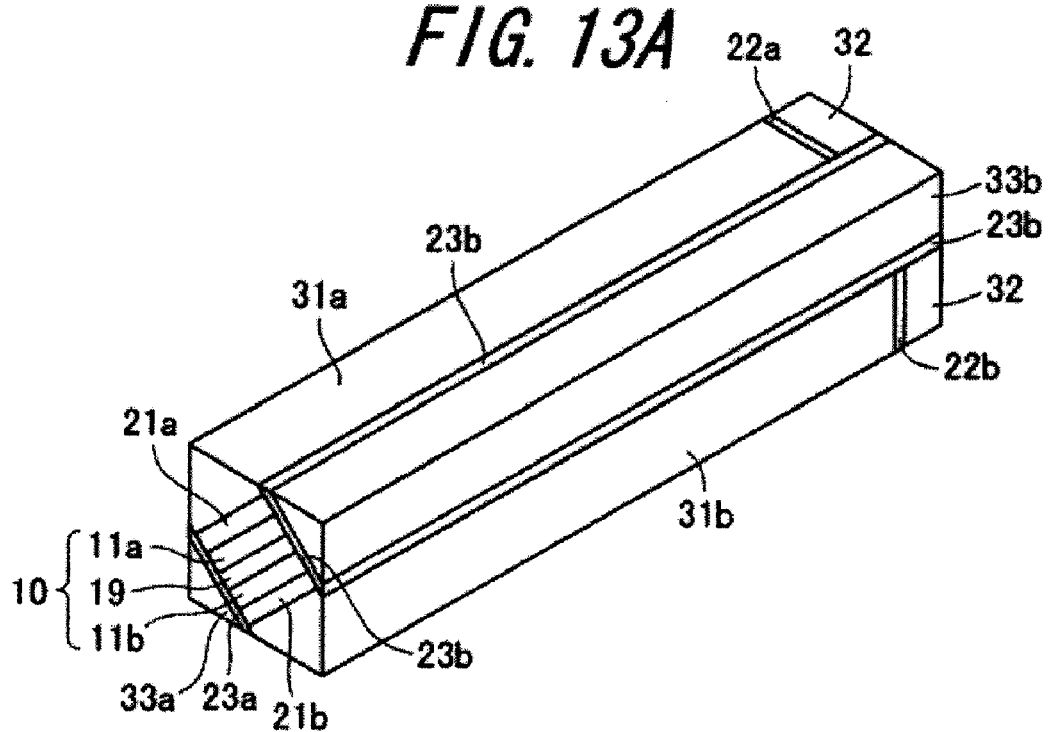
FIG. 13A is an external perspective view schematically showing an alternative embodiment of the acceleration sensor according to the first embodiment.
Figure 13B:
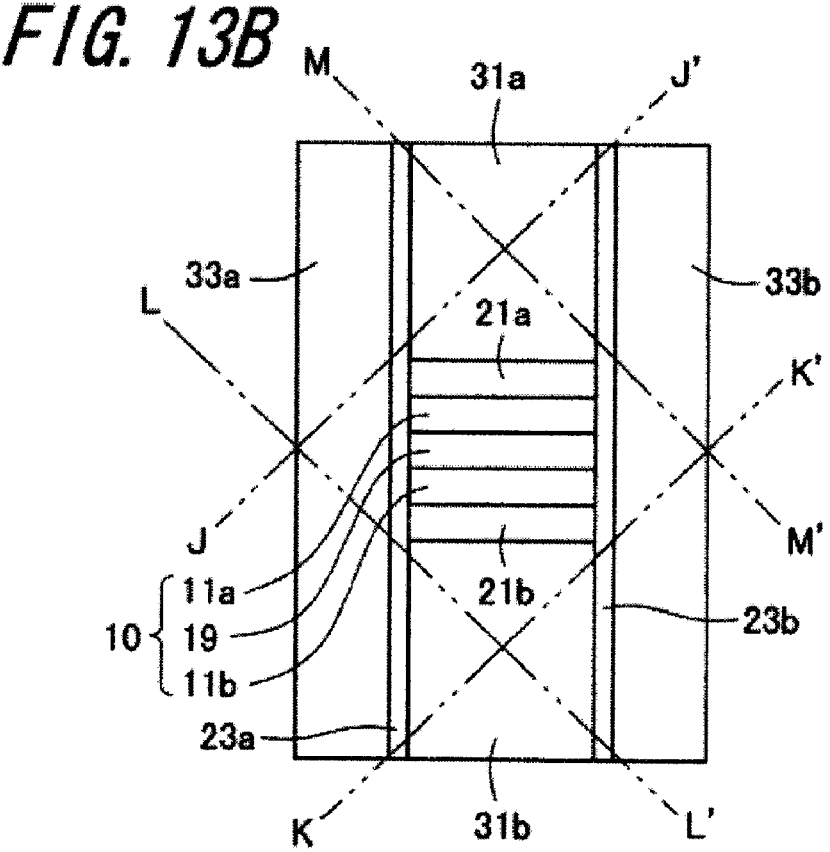
FIG. 13B is a front view schematically illustrating the structure of the acceleration sensor shown in FIG. 13A.

FIG. 13A is an external perspective view schematically showing an alternative embodiment of the acceleration sensor according to the first embodiment of FIGS. 1 to 6. FIG. 13B is a front view schematically illustrating the structure of the acceleration sensor shown in FIG. 13A. In order to provide an easier understanding of the structure, the external terminals 41a and 41b shown in FIG. 1 are omitted in FIGS. 13A and 13B. In this embodiment, only the features that are different from those in the above-described first embodiment is described. Similar components are given the same reference numerals, and repetitive descriptions thereof are omitted.

As shown in FIG. 13A, the acceleration sensor according to this embodiment is characterized in that the principal surfaces of the piezoelectric vibrating element 10 are inclined relative to the four side surfaces of the acceleration sensor.

In the acceleration sensor according to this embodiment, since a direction orthogonal to the principal surfaces of the piezoelectric vibrating element 10, which is a direction in which acceleration is detectable, is inclined relative to the four side surfaces of the acceleration sensor, which are orthogonal to both longitudinal-end surfaces of the piezoelectric vibrating element 10, even if one of the four side surfaces serves as a mounting surface for the acceleration sensor, the direction orthogonal to the principal surfaces of the piezoelectric vibrating element 10 is inclined relative to the mounting surface. Consequently, since acceleration applied in a direction parallel to the mounting surface and acceleration applied in a direction orthogonal to the mounting surface both have a component in the direction orthogonal to the principal surfaces of the piezoelectric vibrating element 10, acceleration applied in the direction parallel to the mounting surface and acceleration applied in the direction orthogonal to the mounting surface can both be detected.

The acceleration sensor according to this embodiment can be easily obtained by cutting the acceleration sensor of the above-described first embodiment along line J-J', line K-K', line L-L', and line M-M', as shown in FIG. 13B. In the acceleration sensor according to this embodiment, the surfaces of the principal-surface protection members 31a and 31b and the side-surface protection members 33a and 33b that face the piezoelectric vibrating element 10 are rectangular-shaped. Furthermore, the acceleration sensor according to each of the second to fourth embodiments described above can also be easily modified as in this embodiment.

The present invention is not limited to the above-described embodiments, and various changes and modifications are permissible so long as they do not depart from the spirit of the invention.

For example, although the charge detecting electrodes 15a and 15b are both extended to the end surface at the first longitudinal end of the acceleration sensor and are respectively connected to the external terminals 41a and 41b on the end surface in the above embodiments, one of the external terminals 41a and 41b may be disposed on the end surface at the second longitudinal end of the acceleration sensor and may be connected to one of the charge detecting electrodes 15a and 15b through an internal wiring conductor. In that case, the pair of principal-surface spacer members 21a and 21b, the pair of side-surface spacer members 23a and 23b, or the end-surface spacer member 22 or members 22a and 22b may partially be provided with conducting portions composed of a conductive material. The conducting portions can be used as part of the internal wiring conductor. For example, in the acceleration sensor according to the first embodiment shown in FIG. 1 and FIGS. 2A to 2C, the surface of one of the side-surface protection members 33a and 33b that faces the piezoelectric vibrating element 10 may be provided with an internal wiring pattern. The internal wiring pattern and one of the charge detecting electrodes 15a and 15b may be connected by means of the conducting portion of one of the side-surface spacer members 23a and 23b. After extending the charge detecting electrode to the end surface at the second longitudinal end of the acceleration sensor by means of the internal wiring pattern, the charge detecting electrode can be connected to one of the external terminals 41a and 41b on the end surface. Consequently, since the external terminals 41a and 41b can be formed on the end surfaces at the two longitudinal ends, a highly reliable acceleration sensor that prevents electrical short circuits caused by soldering between the external terminals 41a and 41b can be achieved.

Furthermore, although the external terminals 41a and 41b are disposed only on a longitudinal-end surface of the acceleration sensor in the above embodiments, the external terminals 41a and 41b may alternatively be disposed on one of the four side surfaces of the acceleration sensor that are orthogonal to the end surface.

Furthermore, although the piezoelectric vibrating element 10 in the above embodiments is constituted by a pair of piezoelectric substrates 11a and 11b stacked in the thickness direction, the piezoelectric vibrating element 10 may alternatively be constituted by a larger number of piezoelectric substrates 11a and 11b stacked in the thickness direction.

Furthermore, although the piezoelectric vibrating element 10 in the above embodiments is formed by joining together the pair of piezoelectric substrates 11a and 11b, each including the charge detecting electrodes 15a and 15b on the opposite principal surfaces thereof, using insulating adhesive 19, the piezoelectric vibrating element 10 may be formed by alternately stacking a plurality of piezoelectric substrates and charge detecting electrodes to form a single unit, or the piezoelectric vibrating element 10 may be formed by disposing a pair of charge detecting electrodes 15a and 15b on opposite principal surfaces of a laminate including a plurality of piezoelectric substrates stacked in the thickness direction. In these cases, the direction of polarization is opposite between the adjoining piezoelectric substrates.

Furthermore, although the pair of principal-surface spacer members 21a and 21b, the pair of side-surface spacer members 23a and 23b, and the end-surface spacer member 22 or members 22a and 22b also have a function of securely bonding and hermetically sealing the components that the members intervene, these spacer members may be small spacer members having, for example, spherical, rod-like, or chip-like shape. In that case, an adhesive or a sealant, for example, may be used for the bonding and the hermetical seal between the piezoelectric vibrating element 10, the pair of principal-surface protection members 31a and 31b, the pair of side-surface protection members 33a and 33b, and the end-surface protection member 32, and the spacer members may be disposed in the adhesive or the sealant.

Furthermore, although the external terminals 41a and 41b are formed on the end surface at the first longitudinal end of the acceleration sensor such that they are parallel to each other in a direction from one principal-surface protection member 31b towards the other principal-surface protection member 31a and are spaced apart from each other, the external terminals 41a and 41b are not limited to this example.

Figure 14B:
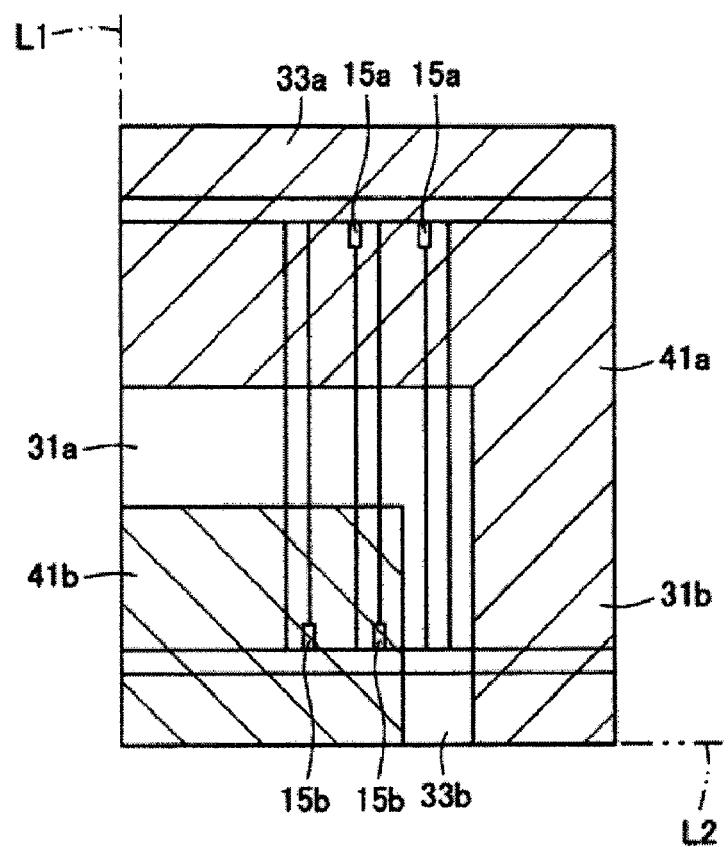

FIGS. 14A and 14B are front views schematically showing other alternative embodiments of the acceleration sensor according to the first embodiment. In the drawings, the external terminals 41a and 41b are hatched in order to provide an easier understanding of their positional relationship with the charge detecting electrodes 15a and 15b.

As shown in FIGS. 14A and 14B, the first external terminal 41b may have a rectangular shape, whereas the second external terminal 41a may substantially have an L-shape. More specifically, the charge detecting electrodes 15b are electrically connected to the first external terminal 41b, and the other charge detecting electrodes 15a are electrically connected to the second external terminal 41a. The first external terminal 41b and the second external terminal 41a are formed on the end surface at the first longitudinal end of the acceleration sensor and are spaced apart from each other. The first external terminal 41b extends from the charge detecting electrodes 15b to a first intersection line L1 and a second intersection line L2 that define the end surface at the first longitudinal end of the acceleration sensor. The first intersection line L1 is defined by a first imaginary plane including the end surface at the first longitudinal end of the piezoelectric vibrating element 10 and a second imaginary plane including an exposed surface of one principal-surface protection member 31b adjacent to the charge detecting electrodes 15b. The second intersection line L2 is defined by the first imaginary plane and a third imaginary plane including an exposed surface of one side-surface protection member 33b adjacent to the charge detecting electrodes 15b. The second external terminal 41a extends from the other charge detecting electrodes 15a to the first intersection line L1 and also extends from the other charge detecting electrodes 15a to the second intersection line L2.

In this embodiment, the first intersection line L1 and the second intersection line L2 are orthogonal to each other. Specifically, the first intersection line L1 is orthogonal to an axis direction for acceleration detection by the acceleration sensor, whereas the second intersection line L2 is parallel to the axis direction for acceleration detection by the acceleration sensor. As shown in FIG. 14A, the acceleration sensor is disposed such that the first intersection line L1 is parallel to the mounting surface, whereby the acceleration sensor can detect acceleration applied in a direction orthogonal to the mounting surface and output an electric signal outward via the external terminals 41a and 41b. On the other hand, as shown in FIG. 14B, the acceleration sensor is disposed such that the second intersection line L2 is parallel to the mounting surface, whereby the acceleration sensor can detect acceleration applied in a direction parallel to the mounting surface and output an electric signal outward via the external terminals 41a and 41b. Accordingly, an electric signal from the piezoelectric vibrating element can be extracted via the external terminals whether the acceleration sensor is mounted at one principal surface thereof including the first intersection line L1 in a direction orthogonal to the end surface or mounted at one side surface thereof including the second intersection line L2 in a direction orthogonal to the end surface. Therefore, whether the axis direction for acceleration detection is orthogonal or parallel to the mounting surface, the acceleration sensor can be disposed so that it can detect acceleration applied in either direction with a single terminal pattern.

In this embodiment, the first external terminal 41b may have a rectangular shape, whereas the second external terminal 41a may substantially have an L-shape. However, the shapes of the external terminals 41a and 41b are not limited to those shown in the drawings so long as the first external terminal 41b extends from the charge detecting electrodes 15b towards the first intersection line L1 and the second intersection line L2, and the second external terminal 41a extends from the other charge detecting electrodes 15a towards the first intersection line L1 and the second intersection line L2.

A specific example of the acceleration sensor according to the first embodiment shown in FIG. 1 and FIGS. 2A to 2C is described below as an example.

First, a piezoelectric block is obtained by adding a binder to lead-zirconate-titanate raw powder and pressing them, and then baking at a peak temperature of 1200° C.

Subsequently, the piezoelectric block is sliced by using a wire saw, and the opposite surfaces thereof are wrapped by using a wrapping device, thereby forming piezoelectric motherboards each including a plurality of element regions that are to become piezoelectric substrates 11a and 11b by cutting. Each piezoelectric motherboard is given a thickness of 100 μm.

Then, a sputtering device is used to form thin metallic films, which are to become charge detecting electrodes 15a and 15b, on the opposite surfaces of the piezoelectric motherboard by patterning. Each thin metallic film has a two-layer structure of chromium and silver, such that a thin chromium layer is first formed to a thickness of 0.3 μm and then a thin silver layer is formed thereon to a thickness of 0.3 μm.

Subsequently, the piezoelectric motherboard with the thin metallic films on the opposite surfaces thereof is immersed in a polarization bath. The piezoelectric motherboard is polarized in the thickness direction thereof by applying a voltage of 300 V thereto for 10 seconds.

A resist pattern is formed on the surface of each thin metallic film by screen printing. Then, the piezoelectric motherboard is immersed in an etching solution to perform patterning on the thin metallic films and is subsequently immersed in toluene to remove the resist layers, thereby forming the charge detecting electrodes 15a and 15b in the element regions on the opposite principal surfaces of the piezoelectric motherboard.

Subsequently, two piezoelectric motherboards with the charge detecting electrodes 15a and 15b in the element regions of the opposite principal surfaces are set inside a vacuum oven and are bonded to each other by inserting a prepreg material composed of glass-fabric-base epoxy resin between the two motherboards. While applying load to the two piezoelectric motherboards, the two are joined to each other by holding them for two hours at a temperature of 180° C. The prepreg material is given a thickness of about 0.1 mm and the two piezoelectric motherboards are bonded to each other such that the direction of polarization is opposite between the two.

Then, a dicing saw is used to cut the piezoelectric motherboards into individual pieces along the border of each element region, thereby obtaining a plurality of piezoelectric vibrating elements 10 at the same time, as shown in FIGS. 3 to 5. The piezoelectric vibrating elements 10 have a flat rectangular shape with a length of 3 mm, a width of 0.5 mm, and a thickness of 0.3 mm.

Then, epoxy resin, which is to become principal-surface spacer members 21a and 21b, is applied to the opposite principal surfaces within a 1-mm region from a first longitudinal end of each piezoelectric vibrating element 10 and is held for about one hour at a temperature of 60° C. so that the epoxy resin becomes semi-cured. The pair of principal-surface spacer members 21a and 21b is each given a thickness of 100 μm.

A pair of principal-surface protection members 31a and 31b having a flat rectangular shape with the same length and width as the piezoelectric vibrating element 10 and a thickness of 0.6 mm are positioned such that the end surfaces at the two longitudinal ends thereof are flush with the end surfaces at the two longitudinal ends of the piezoelectric vibrating element 10, and are bonded to respectively face the opposite principal surfaces of the piezoelectric vibrating element 10 while being spaced apart therefrom by the pair of semi-cured principal-surface spacer members 21a and 21b. The principal-surface protection members 31a and 31b are fixed by being held for one hour at a temperature of 150° C. until the principal-surface spacer members 21a and 21b are fully cured.

Then, epoxy resin, which is to become a pair of end-surface spacer members 22a and 22b, is applied to the second longitudinal ends of the pair of principal-surface protection members 31a and 31b and is held for about one hour at a temperature of 60° C. so that the epoxy resin becomes semi-cured. The end-surface spacer members 22a and 22b are each given a thickness of 50 μm.

Subsequently, an end-surface protection member 32 is bonded to face the end surfaces at the second longitudinal ends of the pair of principal-surface protection members 31a and 31b and the end surface at the second longitudinal end of the piezoelectric vibrating element 10 while being spaced apart from the end surfaces by the pair of semi-cured end-surface spacer members 22a and 22b. The end-surface protection member 32 is fixed by being held for one hour at a temperature of 150° C. until the end-surface spacer members 22a and 22b are cured. The end-surface protection member 32 has a flat rectangular shape with a length of 1.7 mm, a width of 0.5 mm, and a thickness of 0.2 mm. The piezoelectric vibrating element 10, the pair of principal-surface spacer members 21a and 21b, the pair of principal-surface protection members 31a and 31b, the pair of end-surface spacer members 22a and 22b, and the end-surface protection member 32 are positioned such that the opposite side surfaces thereof are respectively flush with each other.

Then, epoxy resin, which is to become a pair of side-surface spacer members 23a and 23b, is annularly applied to the opposite side surfaces of the first longitudinal end of the piezoelectric vibrating element 10 as well as to the opposite side surfaces of the pair of principal-surface protection members 31a and 31b, the end-surface protection member 32, the pair of principal-surface spacer members 21a and 21b, and the pair of end-surface spacer members 22a and 22b and is held for about one hour at a temperature of 60° C. until the epoxy resin is semi-cured. The side-surface spacer members 23a and 23b are each given a thickness of 50 μm.

Subsequently, a pair of side-surface protection members 33a and 33b are bonded to face the piezoelectric vibrating element 10, the pair of principal-surface protection members 31a and 31b, the end-surface protection member 32, the pair of principal-surface spacer members 21a and 21b, and the pair of end-surface spacer members 22a and 22b while being spaced apart therefrom by the pair of semi-cured side-surface spacer members 23a and 23b. The pair of side-surface protection members 33a and 33b are fixed by being held for one hour at a temperature of 150° C. until the pair of side-surface spacer members 23a and 23b are fully cured, whereby an acceleration sensor piece is obtained. The side-surface protection members 33a and 33b each have a flat rectangular shape with a length of 3.25 mm, a width of 1.7 mm, and a thickness of 0.2 mm.

Subsequently, conductive resin, which is to become a pair of external terminals 41a and 41b, is applied to an end surface at a first longitudinal end of the acceleration sensor piece so that the external terminals 41a and 41b can be respectively connected to the charge detecting electrodes 15a and 15b extended to the end surface. The conductive resin is held for one hour at a temperature of 150° C., whereby an acceleration sensor including a pair of external terminals 41a and 41b is completed. The conductive resin is an epoxy-resin-based conductive adhesive containing a conductive filler of silver particles.

Methods of manufacturing the acceleration sensors described above in a single manufacturing process are described below. In the description below, the materials used for the respective components, the dimensions thereof, and the processes are the same as those in the specific example described above, and therefore, detailed descriptions thereof are omitted.

Figure 15D:
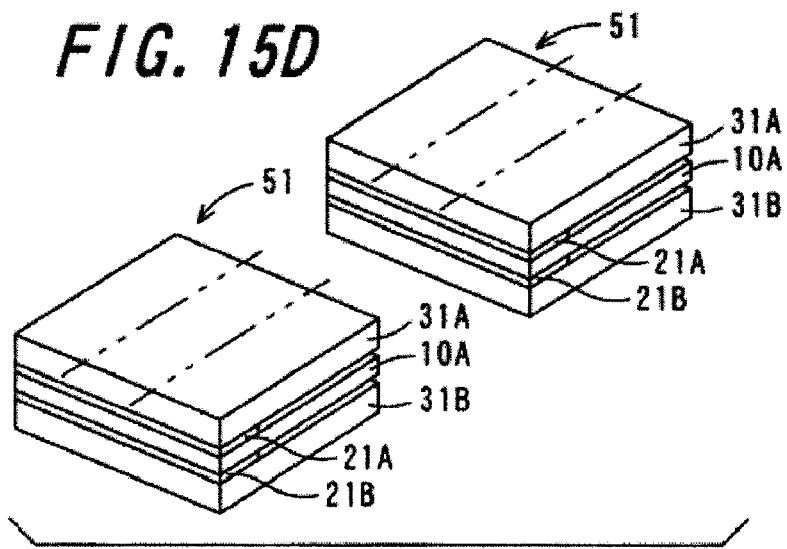

FIGS. 15A to 15L are perspective views showing one embodiment of a manufacturing process for a first acceleration sensor. First, as shown in FIG. 15A, a piezoelectric-vibrating collective board 10A is formed. The piezoelectric-vibrating collective board 10A is formed by joining together polarized piezoelectric motherboards using a prepreg material and then forming charge detecting electrodes 15a and 15b thereon, as described in the specific example above. The piezoelectric-vibrating collective board 10A has a plurality of rectangular element regions 10a arranged in a two-dimensional matrix, which are to become a plurality of piezoelectric vibrating elements 10 by cutting.

Subsequently, as shown in FIG. 15B, principal-surface spacer collective members 21A and 21B, which are to become principal-surface spacer members 21a and 21b by cutting, are formed at positions, which are to become first longitudinal ends of piezoelectric vibrating elements 10, on the opposite principal surfaces of the piezoelectric-vibrating collective board 10A.

Then, as shown in FIG. 15C, principal-surface protection collective members 31A and 31B, which are to become principal-surface protection members 31a and 31b by cutting, are respectively fixed to the principal-surface spacer collective members 21A and 21B. In consequence, a collective body 50 constituted by the piezoelectric-vibrating collective board 10A, the principal-surface spacer collective members 21A and 21B, and the principal-surface protection collective members 31A and 31B is formed.

Next, as shown in FIG. 15D, the collective body 50 is cut along the short sides of the element regions 10a. In consequence, the collective body 50 is divided into first strip-shaped collective-board bodies 51 with the long sides of the element regions 10a in a connected state.

Figure 15E:
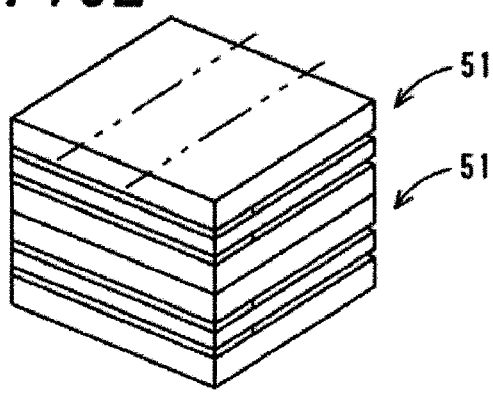

Subsequently, as shown in FIG. 15E, the plurality of first collective-board bodies 51 are stacked in a manner such that the first longitudinal ends of sections that are to become the piezoelectric vibrating elements 10 are flush with each other and the second longitudinal ends of the sections are flush with each other.

Figure 15F:
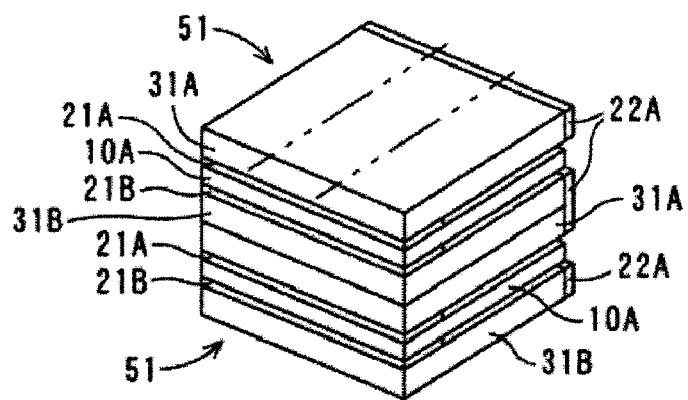

Then, as shown in FIG. 15F, end-surface spacer collective members 22A, which are to become end-surface spacer members 22a and 22b by cutting, are formed on the end surfaces at the second longitudinal ends of the principal-surface protection collective members 31A and 31B.

Figure 15G:
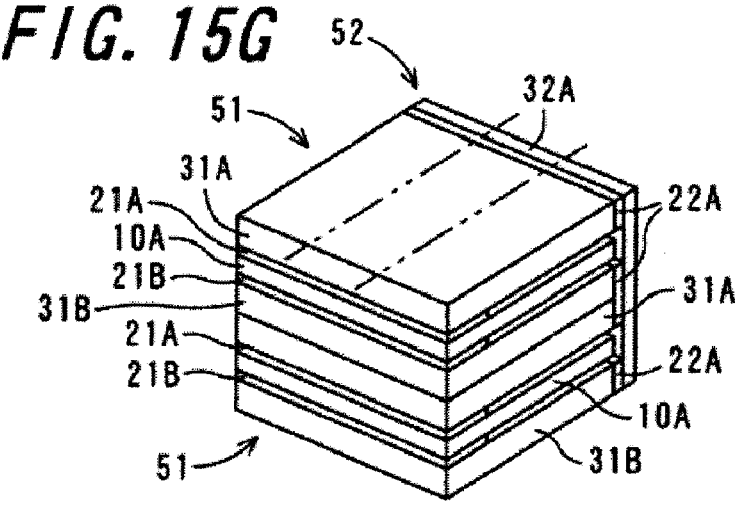

Next, as shown in FIG. 15G, an end-surface protection collective member 32A, which is to become end-surface protection members 32 by cutting, is fixed to the end-surface spacer collective members 22A. In consequence, a collective body 52 constituted by the first collective-board bodies 51, the end-surface spacer collective members 22A, and the end-surface protection collective member 32A is formed.

Figure 15H:
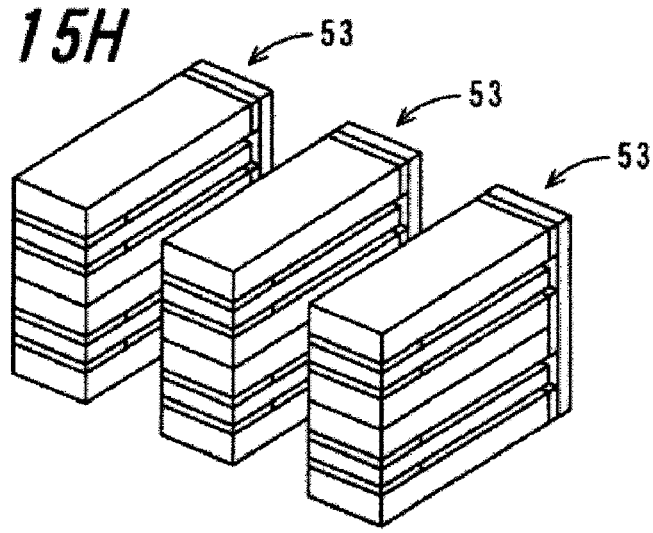

Subsequently, as shown in FIG. 15H, the collective body 52 is cut in the stacking direction of the first collective-board bodies 51 along the long sides of the element regions 10a and the extension lines thereof. In consequence, the collective body 52 is divided into a plurality of second collective-board bodies 53.

Figure 15I:
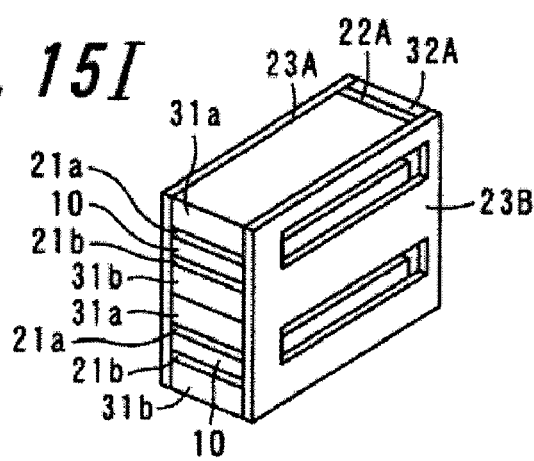

Then, as shown in FIG. 15I, side-surface spacer collective members 23A and 23B, which are to become side-surface spacer members 23a and 23b by cutting, are respectively formed on the opposite side surfaces of the first longitudinal ends of the piezoelectric vibrating elements 10 as well as on the opposite side surfaces of the pairs of principal-surface protection members 31a and 31b, the end-surface protection collective member 32A, the pairs of principal-surface spacer members 21a and 21b, and the end-surface spacer collective members 22A in each second collective body 53.

Figure 15J:
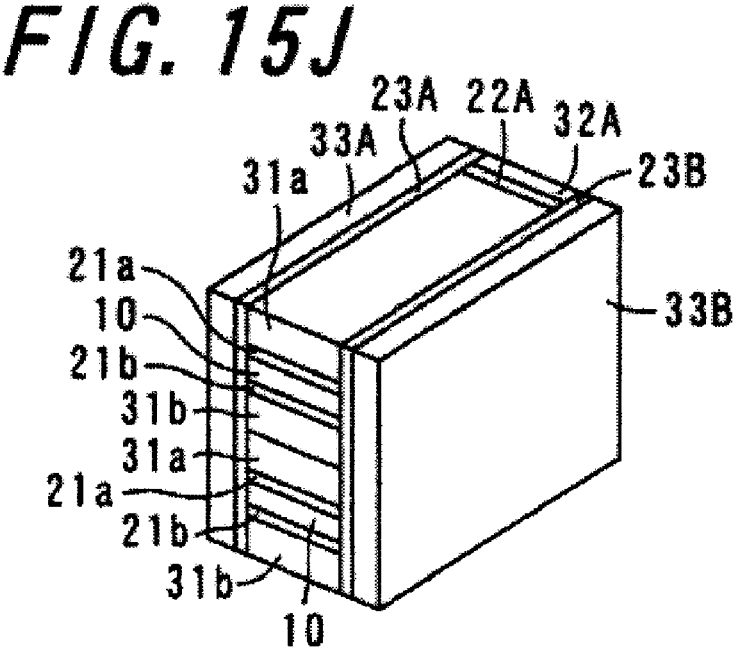

Next, as shown in FIG. 15J, side-surface protection collective members 33A and 33B, which are to become side-surface protection members 33a and 33b by cutting, are respectively fixed to the side-surface spacer collective members 23A and 23B.

Figure 15K:
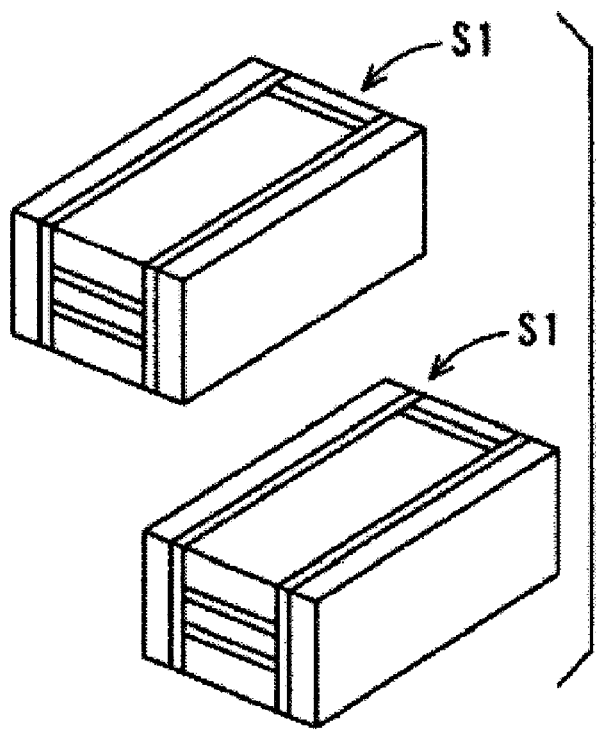

Subsequently, as shown in FIG. 15K, the side-surface spacer collective members 23A and 23B, the side-surface protection collective members 33A and 33B, the end-surface spacer collective members 22A, and the end-surface protection collective member 32A are cut along a plane at which the principal-surface protection members 33a and 33b overlie each other. In consequence, individual acceleration sensor pieces S1 are obtained.

Figure 15L:
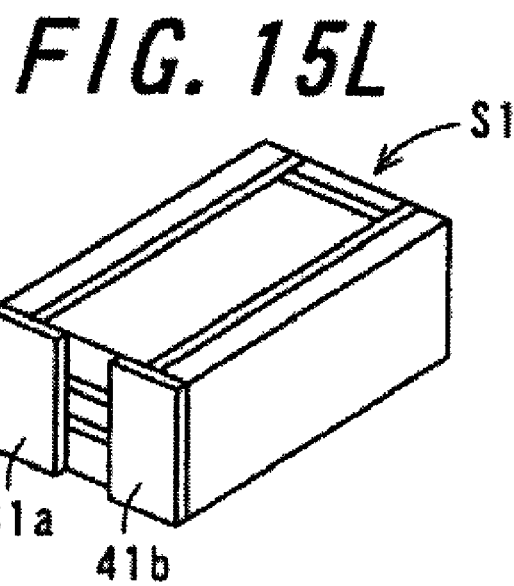

Then, as shown in FIG. 15L, external terminals 41a and 41b are formed on the end surface at a first longitudinal end of each acceleration sensor piece S1. In this manner, the acceleration sensor of the first embodiment above is manufactured.

Figure 16A:
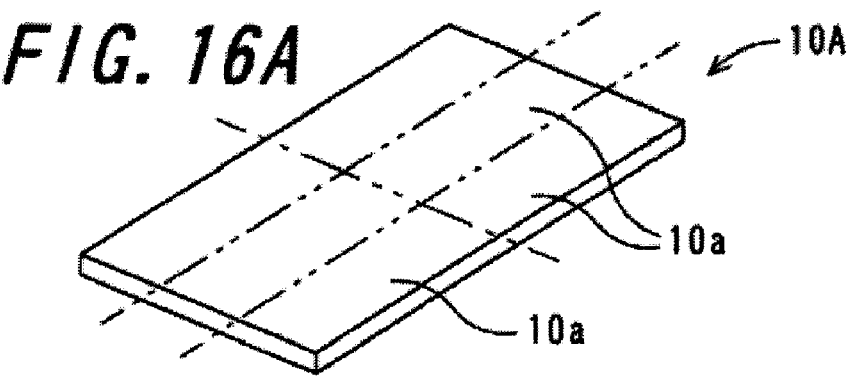
FIGS. 16A to 16L are perspective views showing a manufacturing process for a second acceleration sensor.

FIGS. 16A to 16L are perspective views illustrating an embodiment of a manufacturing process for a second acceleration sensor of the second embodiment above. First, as shown in FIG. 16A, a piezoelectric-vibrating collective board 10A is formed in a similar manner to the step shown in FIG. 15A. Specifically, the piezoelectric-vibrating collective board 10A is formed by joining together polarized piezoelectric motherboards using a prepreg material and then forming charge detecting electrodes 15a and 15b thereon, as described in the specific example above. The piezoelectric-vibrating collective board 10A has a plurality of rectangular element regions 10a arranged in a two-dimensional matrix, which are to become a plurality of piezoelectric vibrating elements 10 by cutting.

Figure 16B:
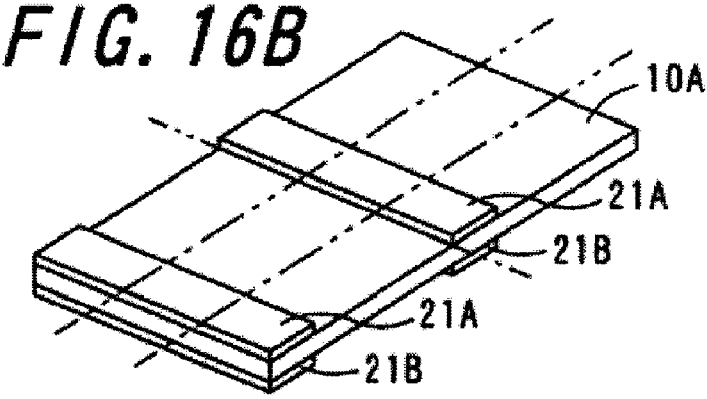

Subsequently, in a similar manner to the step shown in FIG. 15B, principal-surface spacer collective members 21A and 21B, which are to become principal-surface spacer members 21a and 21b by cutting, are formed at positions, which are to become first longitudinal ends of piezoelectric vibrating elements 10, on the opposite principal surfaces of the piezoelectric-vibrating collective board 10A, as shown in FIG. 16B.

Figure 16C:
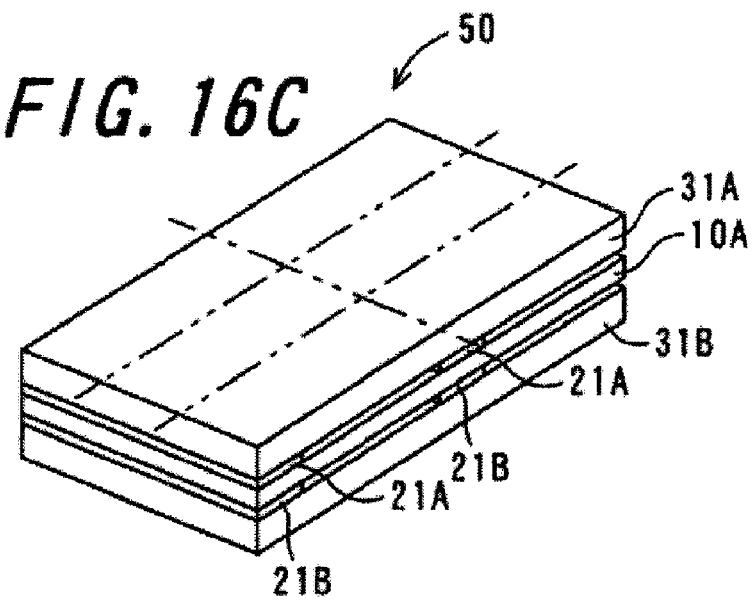

Then, in a similar manner to the step shown in FIG. 15C, principal-surface protection collective members 31A and 31B, which are to become principal-surface protection members 31a and 31b by cutting, are respectively fixed to the principal-surface spacer collective members 21A and 21B, as shown in FIG. 16C. In consequence, a collective body 50 constituted by the piezoelectric-vibrating collective board 10A, the principal-surface spacer collective members 21A and 21B, and the principal-surface protection collective members 31A and 31B is formed.

Figure 16D:
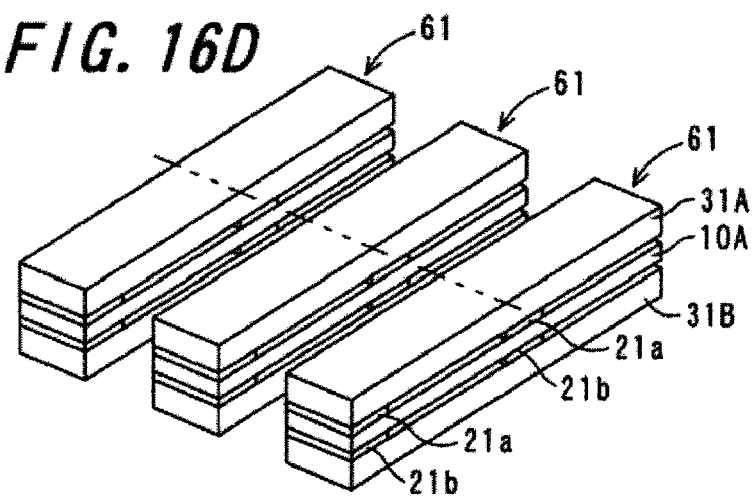

Next, as shown in FIG. 16D, the collective body 50 is cut along long sides of the element regions 10a. In consequence, the collective body 50 is divided into third collective-board bodies 61 with the short sides of the element regions 10a in a connected state.

Figure 16E:
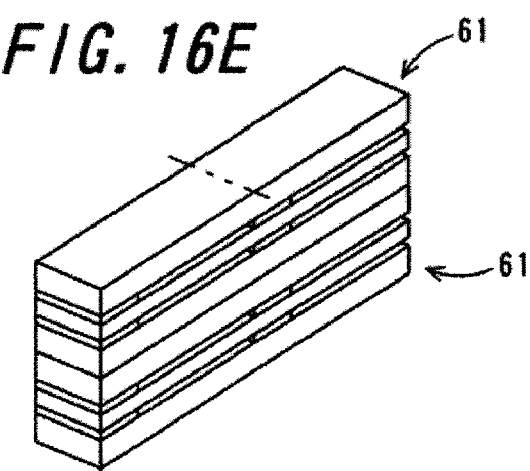

Subsequently, as shown in FIG. 16E, the plurality of third collective-board bodies 61 are stacked in a manner such that first sides of sections, in the width direction orthogonal to the longitudinal direction, which are to become the piezoelectric vibrating elements 10 are flush with each other and second sides of the sections in the width direction are flush with each other.

Figure 16F:
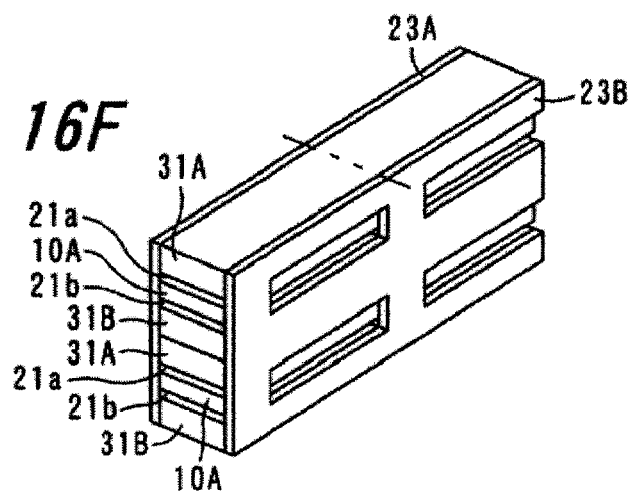

Then, as shown in FIG. 16F, a pair of side-surface spacer collective members 23A and 23B, which are to become pairs of side-surface spacer members 23a and 23b by cutting, are formed on the opposite side surfaces of the first longitudinal ends of the sections that are to become the piezoelectric vibrating elements 10 as well as on the opposite side surfaces of the pairs of principal-surface protection collective members 31A and 31B and the pairs of principal-surface spacer members 21a and 21b.

Figure 16G:
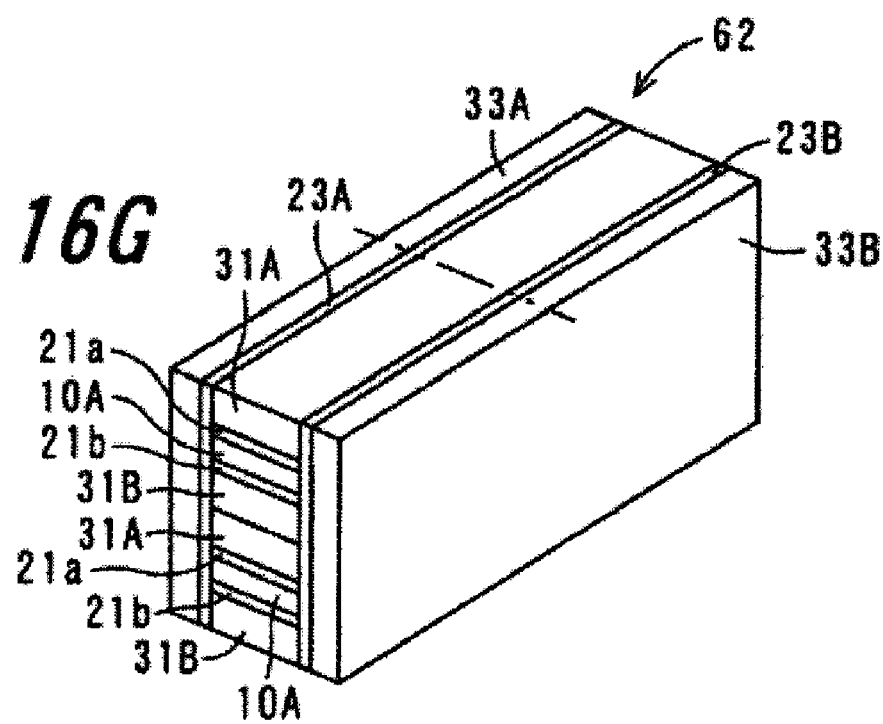

Next, as shown in FIG. 16G, side-surface protection collective members 33A and 33B, which are to become side-surface protection members 33a and 33b by cutting, are respectively fixed to the side-surface spacer collective members 23A and 23B. In consequence, a collective body 62 constituted by the plurality of third collective-board bodies 61, the side-surface spacer collective members 23A and 23B, and the side-surface protection collective members 33A and 33B is formed.

Figure 16H:
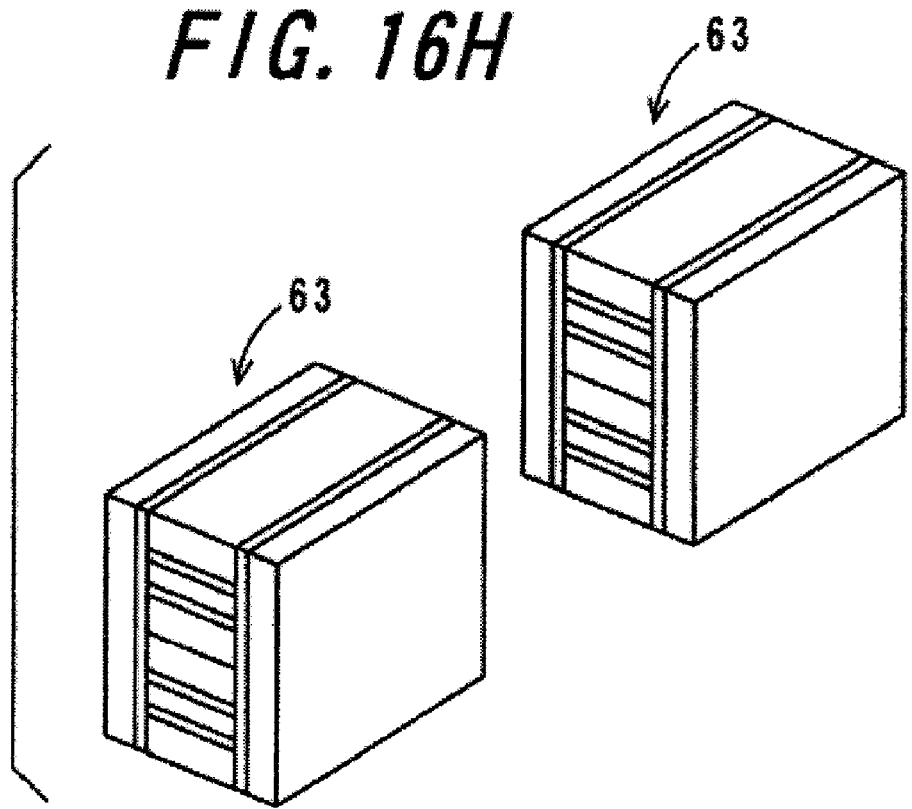

Subsequently, as shown in FIG. 16H, the collective body 62 is cut in the stacking direction of the third collective-board bodies 61 along a short side of the element regions 10a and an extension line thereof. In consequence, the collective body 62 is divided into a plurality of fourth collective-board bodies 63.

Figure 16I:
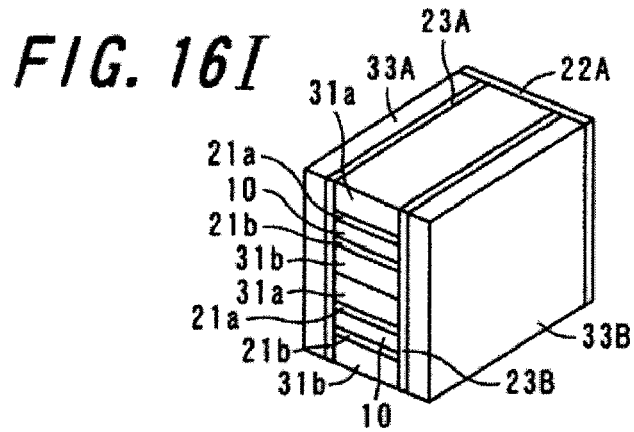

Then, as shown in FIG. 16I, an end-surface spacer collective member 22A, which is to become end-surface spacer members 22 by cutting, is formed on the end surfaces at the second longitudinal ends of the principal-surface protection members 31a and 31b, the side-surface spacer collective members 23A and 23B, and the side-surface protection collective members 33A and 33B in each fourth collective-board body 63.

Figure 16J:
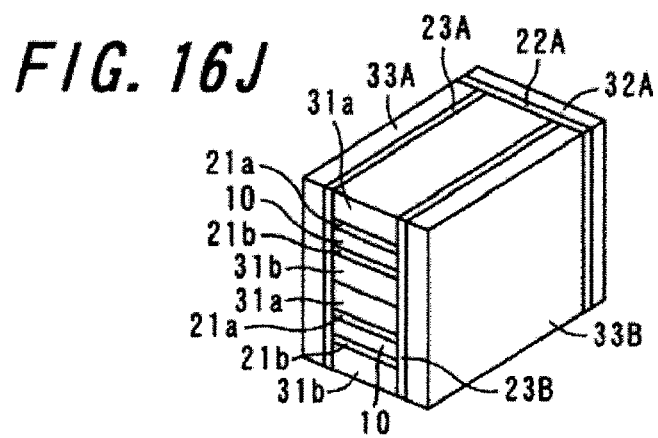

Next, as shown in FIG. 16J, an end-surface protection collective member 32A, which is to become end-surface protection members 32 by cutting, is fixed to the end-surface spacer collective member 22A.

Figure 16K:
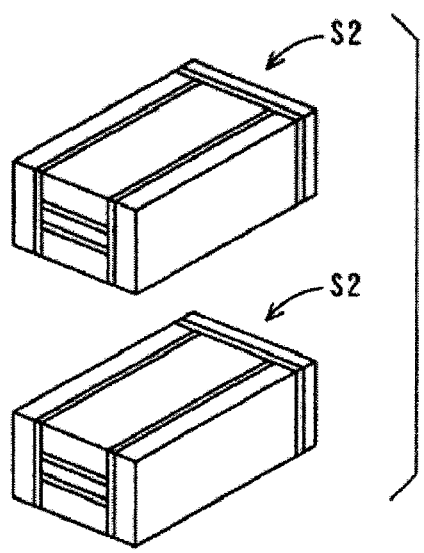

Subsequently, as shown in FIG. 16K, the side-surface spacer collective members 23A and 23B, the side-surface protection collective members 33A and 33B, the end-surface spacer collective member 22A, and the end-surface protection collective member 32A are cut along a plane at which the principal-surface protection members 31a and 31b overlie each other. In consequence, individual acceleration sensor pieces S2 are obtained.

Figure 16L:
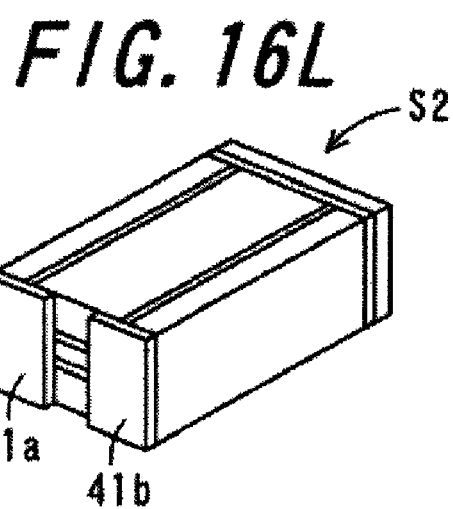

Then, as shown in FIG. 16L, external terminals 41a and 41b are formed on the end surface at a first longitudinal end of each acceleration sensor piece S2. In this manner, the second acceleration sensor of FIGS. 7 and 8 is manufactured.

Figure 17A:
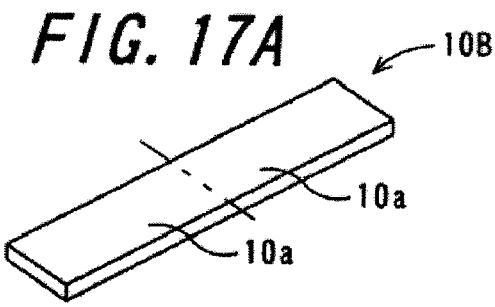
FIGS. 17A to 17K are perspective views showing a manufacturing process for a third acceleration sensor.

FIGS. 17A to 17K are perspective views showing an embodiment of a manufacturing process for a third acceleration sensor, such as the sensor of the third embodiment of FIGS. 9 and 10. First, as shown in FIG. 17A, a strip-shaped piezoelectric-vibrating collective board 10B is formed. Specifically, the strip-shaped piezoelectric-vibrating collective board 10B is formed by joining together polarized piezoelectric motherboards using a prepreg material and then forming charge detecting electrodes 15a and 15b thereon, as described in the specific example above. More specifically, the piezoelectric-vibrating collective board 10B is a strip-shaped board formed by cutting the piezoelectric-vibrating collective board 10A, as shown in FIGS. 15A and 16A, along the long sides of the element regions 10a. Therefore, the piezoelectric-vibrating collective board 10B has a plurality of rectangular element regions 10a arranged in a one-dimensional matrix in the longitudinal direction, which are to become a plurality of piezoelectric vibrating elements 10 by cutting.

Figure 17B:
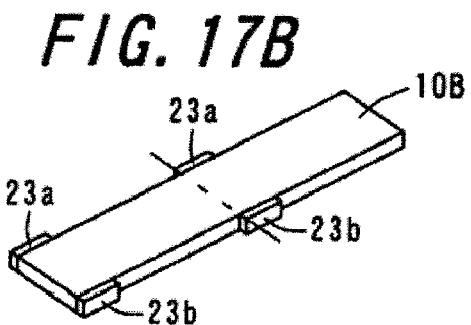

Subsequently, as shown in FIG. 17B, in the piezoelectric-vibrating collective board 10B, pairs of side-surface spacer members 23a and 23b are formed on the opposite side surfaces of first longitudinal ends of sections that are to become the piezoelectric vibrating elements 10.

Figure 17C:
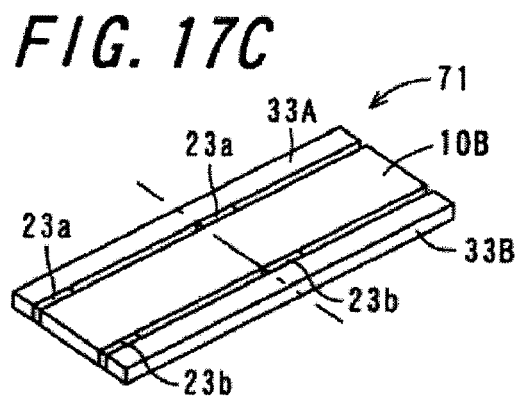

Then, as shown in FIG. 17C, side-surface protection collective members 33A and 33B, which are to become side-surface protection members 33a and 33b by cutting and have the same thickness as the piezoelectric-vibrating collective board 10B, are prepared. The side-surface protection collective members 33A and 33B are respectively fixed to the side-surface spacer members 23a and 23b such that the principal surfaces of the piezoelectric-vibrating collective board 10B are flush with the surfaces of the side-surface protection collective members 33A and 33B. In consequence, a fifth collective-board body 71 constituted by the piezoelectric-vibrating collective board 10B, the pairs of side-surface spacer members 23a and 23b, and the pair of side-surface protection collective members 33A and 33B is formed.

Figure 17D:
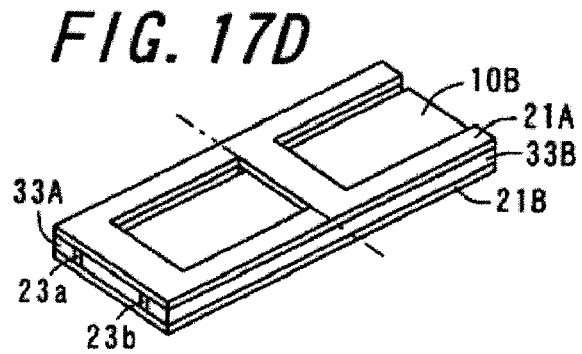

Next, as shown in FIG. 17D, principal-surface spacer collective members 21A and 21B, which are to become principal-surface spacer members 21a and 21b by cutting, are respectively formed on the opposite principal surfaces of the first longitudinal ends of the sections of the piezoelectric-vibrating collective board 10B that are to become the piezoelectric vibrating elements 10 as well as on the opposite surfaces of the pair of side-surface protection collective members 33A and 33B and the pairs of side-surface spacer members 23a and 23b.

Figure 17E:
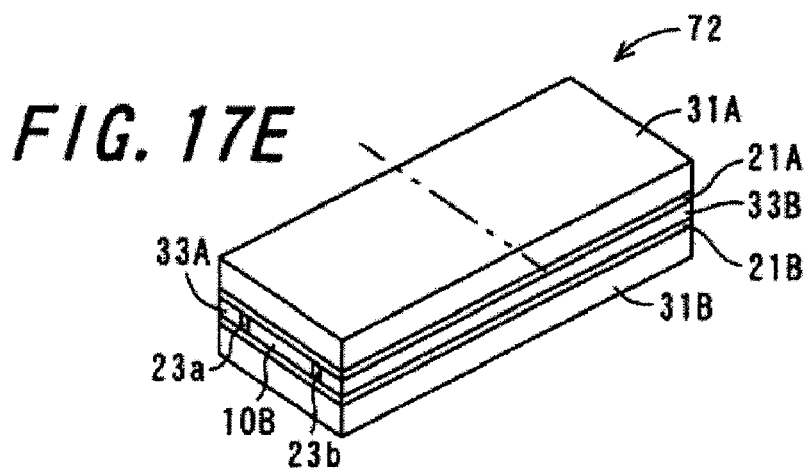

Subsequently, as shown in FIG. 17E, principal-surface protection collective members 31A and 31B, which are to become principal-surface protection members 31a and 31b by cutting, are respectively fixed to the principal-surface spacer collective members 21A and 21B. In consequence, a collective body 72 constituted by the piezoelectric-vibrating collective board 10B, the side-surface spacer members 23a and 23b, the side-surface protection collective members 33A and 33B, the principal-surface spacer collective members 21A and 21B, and the principal-surface protection collective members 31A and 31B is formed.

Figure 17F:
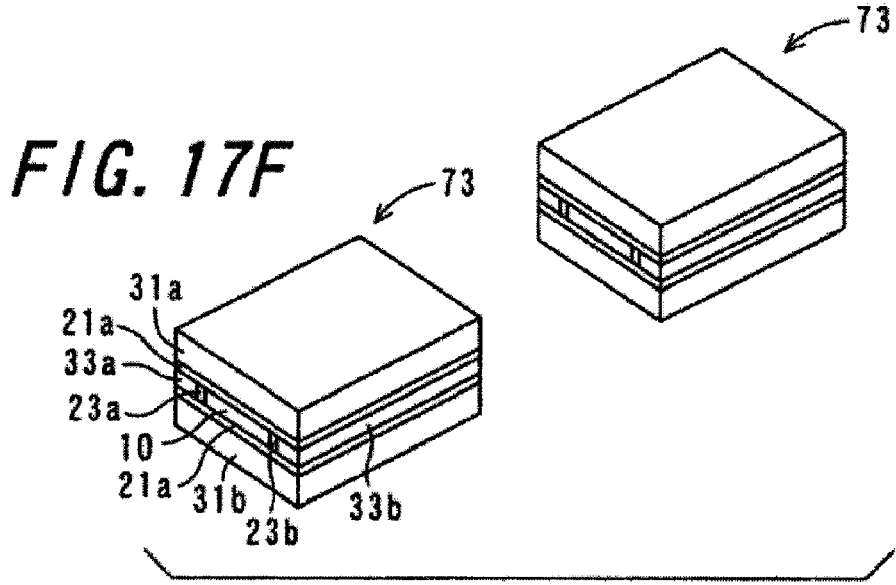

Then, as shown in FIG. 17F, the collective body 72 is cut along a short side of the element regions 10a and an extension line thereof from the principal-surface side of the sections that are to become the piezoelectric vibrating elements 10. In consequence, the collective body 72 is divided into sixth collective-board bodies 73 each constituted by a piezoelectric vibrating element 10, side-surface spacer members 23a and 23b, side-surface protection members 33a and 33b, principal-surface spacer members 21a and 21b, and principal-surface protection members 31a and 31b.

Figure 17G:
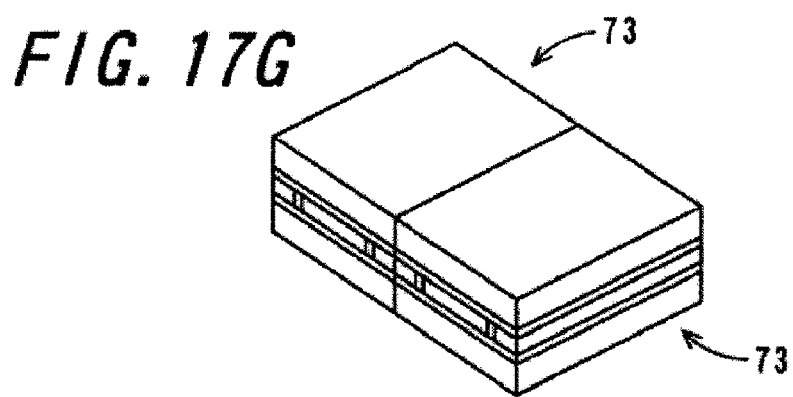

Next, as shown in FIG. 17G, the plurality of sixth collective-board bodies 73 are arranged such that the first longitudinal ends of the piezoelectric vibrating elements 10 are flush with each other and the second longitudinal ends thereof are flush with each other. Although the sixth collective-board bodies 73 are arranged such that side surfaces thereof abut on each other in the example shown in the drawing, other alternatives are possible. For example, the sixth collective-board bodies 73 may be stacked one on top of the other such that the first longitudinal ends of the piezoelectric vibrating elements 10 are flush with each other and the second longitudinal ends thereof are flush with each other.

Figure 17H:
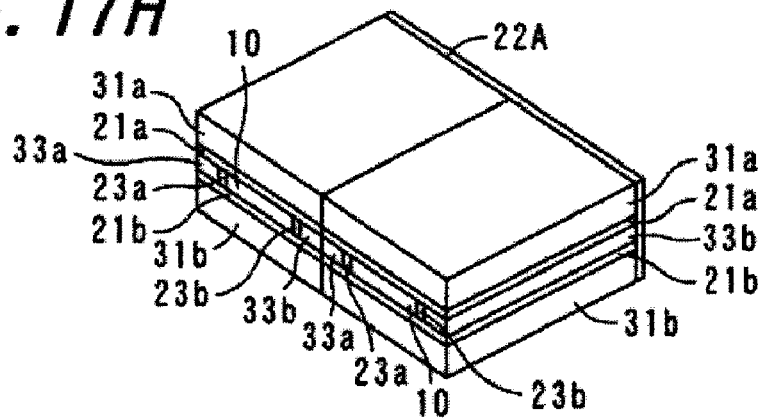

Subsequently, as shown in FIG. 17H, an end-surface spacer collective member 22A, which is to become end-surface spacer members 22 by cutting, is formed on the end surfaces at the second longitudinal ends of the principal-surface spacer members 21a and 21b, the principal-surface protection members 31a and 31b, and the side-surface protection members 33a and 33b in the sixth collective-board bodies 73.

Figure 17I:
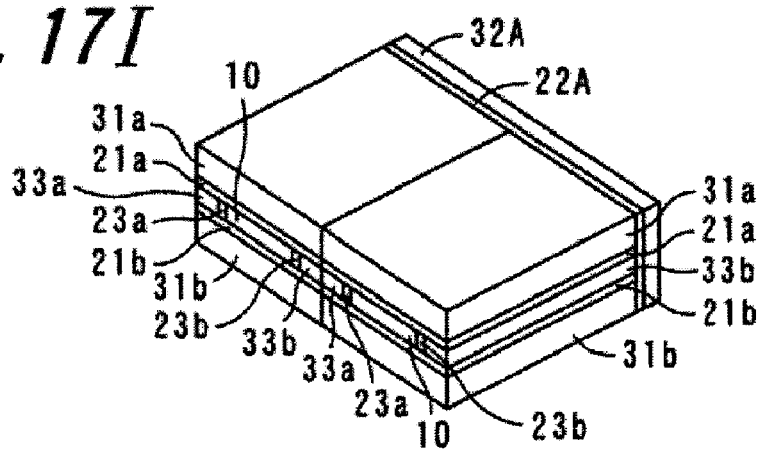

Then, as shown in FIG. 17I, an end-surface protection collective member 32A, which is to become end-surface protection members 32 by cutting, is fixed to the end-surface spacer collective member 22A.

Figure 17J:
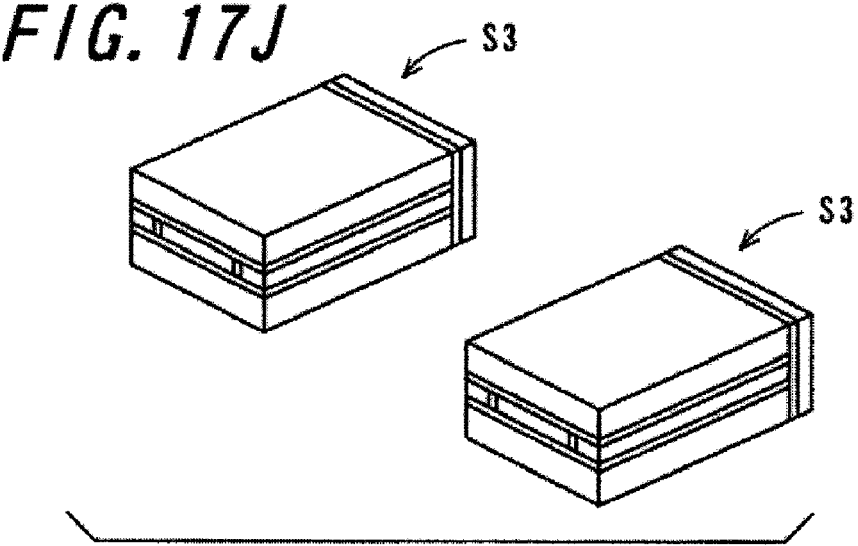

Next, as shown in FIG. 17J, the end-surface spacer collective member 22A and the end-surface protection collective member 32A are cut along a plane at which the principal-surface protection members 31a and 31b overlie each other. In consequence, individual acceleration sensor pieces S3 are obtained.

Figure 17K:
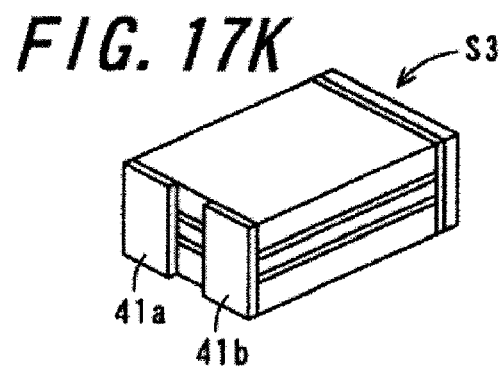

Subsequently, as shown in FIG. 17K, external terminals 41a and 41b are formed on the end surface at a first longitudinal end of each acceleration sensor piece S3. In this manner, the third acceleration sensor of FIGS. 9 and 10 is manufactured.

Figure 18A:
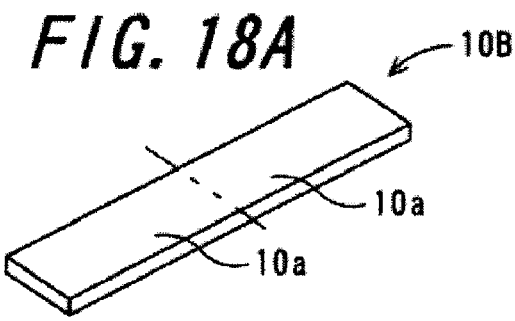
FIGS. 18A to 18K are perspective views showing a manufacturing process for a fourth acceleration sensor.

FIGS. 18A to 18K are perspective views showing a manufacturing process for a fourth acceleration sensor S4 such as the sensor of the fourth embodiment of FIGS. 11 and 12. First, in a similar manner to the step shown in FIG. 17A, a strip-shaped piezoelectric-vibrating collective board 10B is formed, as shown in FIG. 18A. Specifically, the strip-shaped piezoelectric-vibrating collective board 10B is formed by joining together polarized piezoelectric motherboards using a prepreg material and then forming charge detecting electrodes 15a and 15b thereon, as described in the specific example above. More specifically, the piezoelectric-vibrating collective board 10B is a strip-shaped board formed by cutting the piezoelectric-vibrating collective board 10A, as shown in FIGS. 15A and 16A, along the long sides of the element regions 10a. Therefore, the piezoelectric-vibrating collective board 10B has a plurality of rectangular element regions 10a arranged in a one-dimensional matrix in the longitudinal direction, which are to become a plurality of piezoelectric vibrating elements 10 by cutting.

Figure 18B:
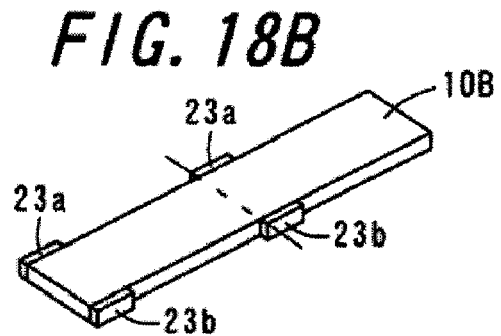

Subsequently, in a similar manner to the step shown in FIG. 17B, in the piezoelectric-vibrating collective board 10B, pairs of side-surface spacer members 23a and 23b are formed on the opposite side surfaces of first longitudinal ends of sections that are to become the piezoelectric vibrating elements 10, as shown in FIG. 18B.

Figure 18C:
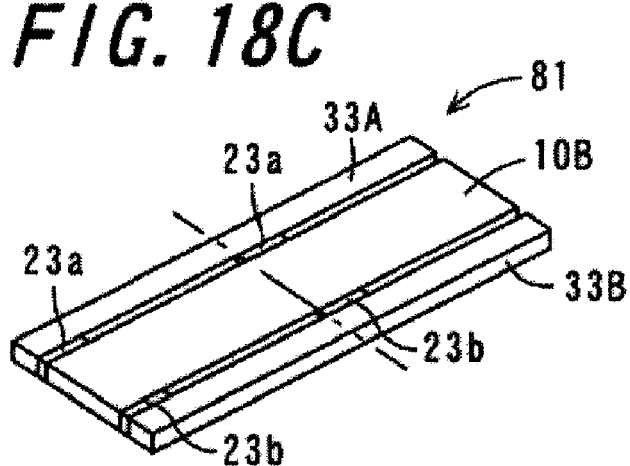

Then, in a similar manner to the step shown in FIG. 17C, side-surface protection collective members 33A and 33B, which are to become side-surface protection members 33a and 33b by cutting and have the same thickness as the piezoelectric-vibrating collective board 10B, are prepared, as shown in FIG. 18C. The side-surface protection collective members 33A and 33B are respectively fixed to the side-surface spacer members 23a and 23b such that the principal surfaces of the piezoelectric-vibrating collective board 10B are flush with the surfaces of the side-surface protection collective members 33A and 33B. In consequence, a fifth collective-board body 81 constituted by the piezoelectric-vibrating collective board 10B, the pairs of side-surface spacer members 23a and 23b, and the pair of side-surface protection collective members 33A and 33B is formed.

Figure 18D:
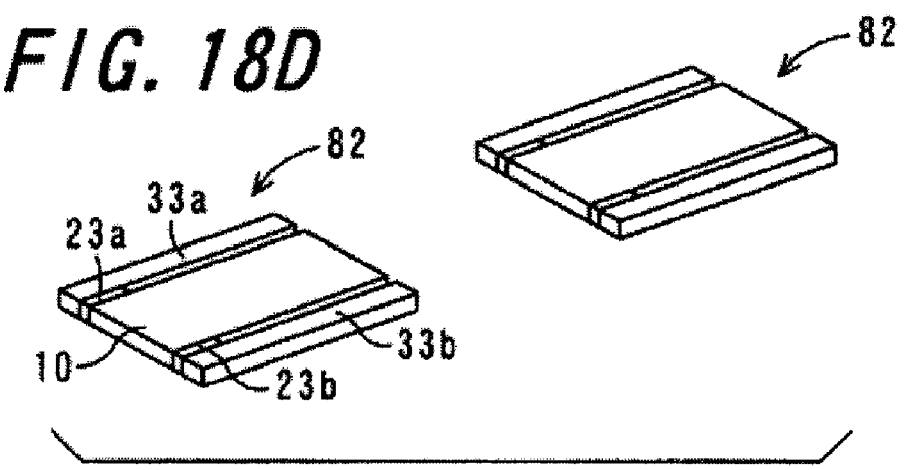

Next, as shown in FIG. 18D, the fifth collective-board body 81 is cut along a short side of the element regions 10a and an extension line thereof from the principal-surface side of the sections that are to become the piezoelectric vibrating elements 10. In consequence, seventh collective-board bodies 82 each constituted by a piezoelectric vibrating element 10, a pair of side-surface spacer members 23a and 23b, and a pair of side-surface protection members 33a and 33b is formed.

Figure 18E:
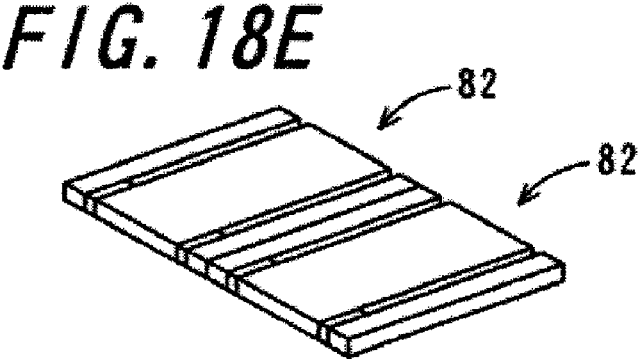

Subsequently, as shown in FIG. 18E, the plurality of seventh collective-board bodies 82 are arranged such that first principal surfaces of the piezoelectric vibrating elements 10 are flush with each other and second principal surfaces thereof are flush with each other and that the first longitudinal ends of the piezoelectric vibrating elements 10 are flush with each other and the second longitudinal ends thereof are flush with each other.

Figure 18F:
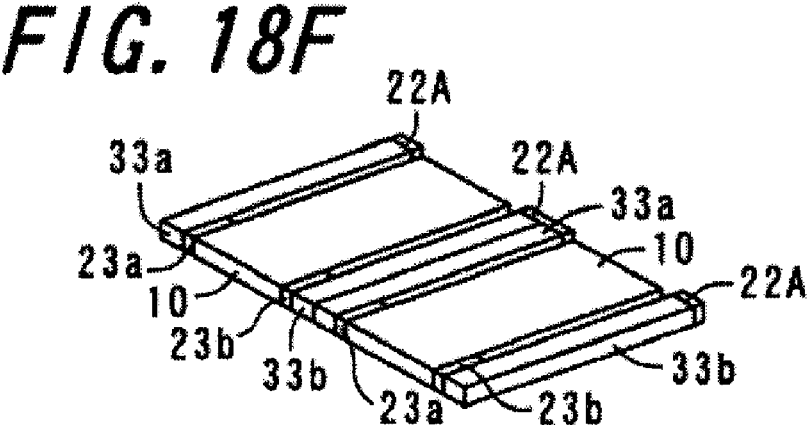

Then, as shown in FIG. 18F, an end-surface spacer collective member 22A, which is to become end-surface spacer members 22a and 22b by cutting, is formed on the end surfaces at the second longitudinal ends of the side-surface protection members 33a and 33b.

Figure 18G:
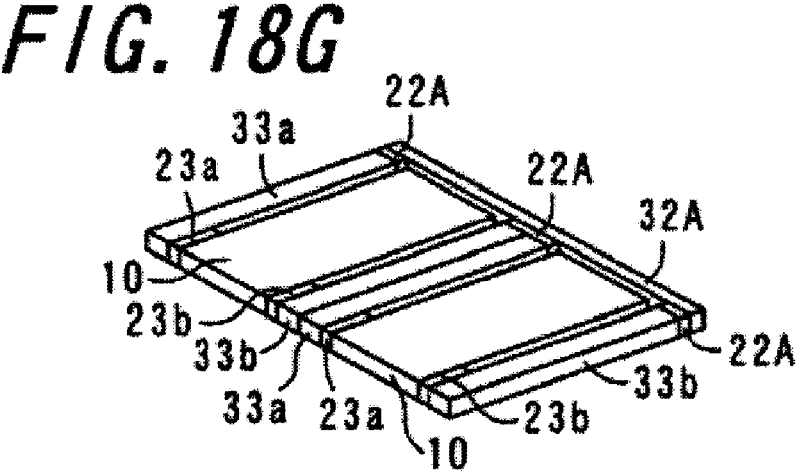

Next, as shown in FIG. 18G, an end-surface protection collective member 32A, which is to become end-surface protection members 32 by cuffing and has the same thickness as the piezoelectric vibrating elements 10, is prepared. The end-surface protection collective member 32A is fixed to the end-surface spacer collective member 22A such that the principal surfaces of the piezoelectric vibrating elements 10 are flush with the surfaces of the side-surface protection members 33a and 33b and the surfaces of the end-surface protection collective member 32A.

Figure 18H:
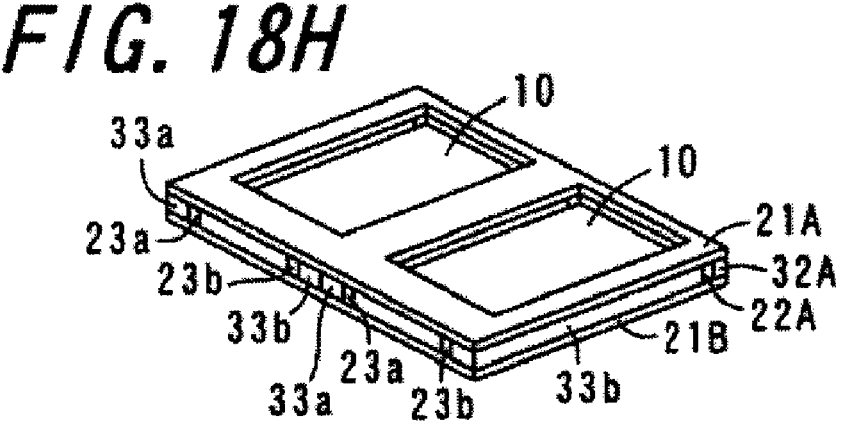

Subsequently, as shown in FIG. 18H, principal-surface spacer collective members 21A and 21B, which are to become principal-surface spacer members 21a and 21b by cutting, are respectively formed on the opposite principal surfaces of the first longitudinal ends of the piezoelectric vibrating elements 10 as well as on the opposite surfaces of the side-surface spacer members 23a and 23b, the side-surface protection members 33a and 33b, the end-surface spacer collective member 22A, and the end-surface protection collective member 32A.

Figure 18I:
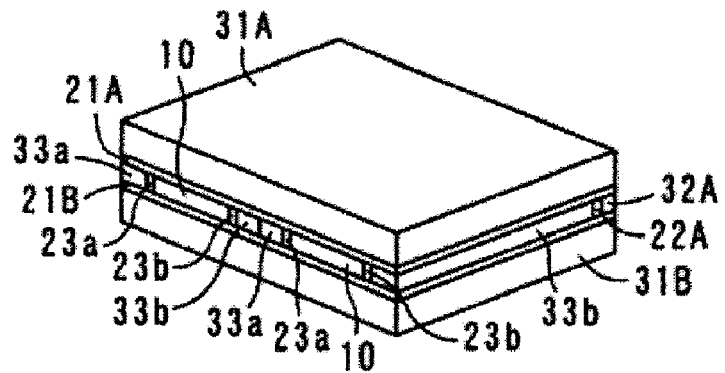

Then, as shown in FIG. 18I, principal-surface protection collective members 31A and 31B, which are to become principal-surface protection members 31a and 31b by cutting, are fixed to the principal-surface spacer collective members 21A and 21B.

Figure 18J:
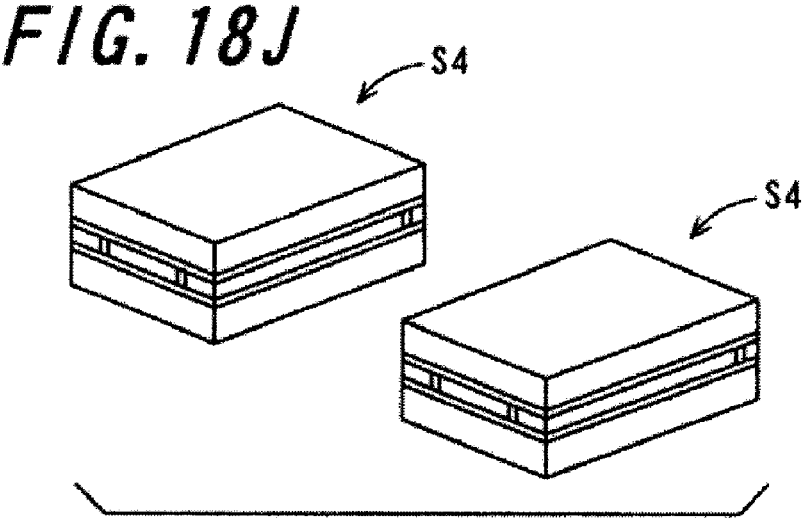
Figure 18K:
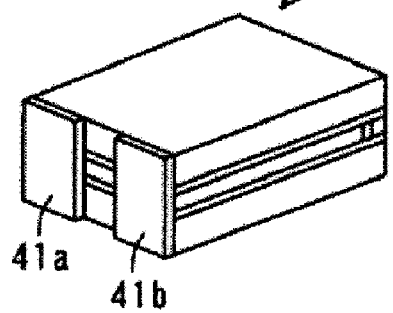

Next, as shown in FIG. 18J, the principal-surface spacer collective members 21A and 21B, the principal-surface protection collective members 31A and 31B, the end-surface spacer collective member 22A, and the end-surface protection collective member 32A are cut along a plane at which the side-surface protection members 33a and 33b overlie each other. In consequence, individual acceleration sensor pieces S4 are obtained.

External terminals 41a and 41b are formed on the end surface at a first longitudinal end of each acceleration sensor piece S4. In this manner, the fourth acceleration sensor of FIGS. 11 and 12 is manufactured.

The acceleration sensors described above are simple-structured and easy to manufacture, as well as being compact and having high acceleration-detecting sensitivity.

According to the manufacturing methods described above, a plurality of compact, simple-structured, and easy to manufacture acceleration sensors with high acceleration-detecting sensitivity can be manufactured in a single manufacturing process.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein are representative of the subject matter which is broadly contemplated by the present invention. It is further understood that the scope of the present invention is not intended to be limited to the embodiments shown herein but is to be accorded the widest scope consistent with the principles and novel features disclosed herein.

The invention claimed is:

1. An acceleration sensor comprising:
    a piezoelectric vibrating element including a plurality of flat rectangular piezoelectric substrates stacked in a thickness direction and charge detecting electrodes respectively disposed on opposite principal surfaces thereof;
    a pair of principal-surface spacer members respectively disposed on the opposite principal surfaces of a first longitudinal end of the piezoelectric vibrating element;
    a pair of rectangular principal-surface protection members whose end surfaces at first longitudinal ends and second longitudinal ends thereof are respectively flush with end surfaces at the first longitudinal end and a second longitudinal end of the piezoelectric vibrating element, the pair of rectangular principal-surface protection members being respectively spaced apart from the opposite principal surfaces of the piezoelectric vibrating element by the pair of principal-surface spacer members;
    a pair of end-surface spacer members respectively disposed on the end surfaces at the second longitudinal ends of the pair of principal-surface protection members;
    an end-surface protection member spaced apart from the end surfaces at the second longitudinal ends of the pair of principal-surface protection members by the end-surface spacer members;
    a pair of side-surface spacer members respectively disposed on opposite side surfaces of the first longitudinal end of the piezoelectric vibrating element as well as on opposite side surfaces of the pair of principal-surface protection members and the end-surface protection member; and
    a pair of side-surface protection members respectively spaced apart from the opposite side surfaces of the piezoelectric vibrating element, the pair of principal-surface protection members, and the end-surface protection member by the pair of side-surface spacer members,
    wherein the end surface spacer members include respective surfaces that contact the rectangular principal-surface protection members, said respective surfaces being coplanar with the second longitudinal end of the piezoelectric vibrating element.

2. An acceleration sensor comprising:
    a piezoelectric vibrating element including a plurality of flat rectangular piezoelectric substrates stacked in a thickness direction and charge detecting electrodes respectively disposed on opposite principal surfaces thereof;
    a pair of principal-surface spacer members respectively disposed on the opposite principal surfaces of a first longitudinal end of the piezoelectric vibrating element;
    a pair of rectangular principal-surface protection members whose end surfaces at first longitudinal ends and second longitudinal ends thereof are respectively flush with end surfaces at the first longitudinal end and a second longitudinal end of the piezoelectric vibrating element, the pair of rectangular principal-surface protection members being respectively spaced apart from the opposite principal surfaces of the piezoelectric vibrating element by the pair of principal-surface spacer members;
    a pair of side-surface spacer members respectively disposed on opposite side surfaces of the first longitudinal end of the piezoelectric vibrating element as well as on opposite side surfaces of the pair of principal-surface protection members;
    a pair of rectangular side-surface protection members whose end surfaces at first longitudinal ends and second longitudinal ends thereof are respectively flush with the end surfaces at the first longitudinal end and the second longitudinal end of the piezoelectric vibrating element, the pair of rectangular side-surface protection members being respectively spaced apart from the opposite side surfaces of the piezoelectric vibrating element and the pair of principal-surface protection members by the pair of side-surface spacer members;
    an end-surface spacer member disposed on the end surfaces at the second longitudinal ends of the pair of principal-surface protection members and the pair of side-surface protection members; and
    an end-surface protection member spaced apart from the end surfaces at the second longitudinal end of the piezoelectric vibrating element, the pair of principal-surface protection members, and the pair of side-surface protection members by the end-surface spacer member,
    wherein the end surface space member include respective surfaces that contact the rectangular principal-surface protection members, said respective surfaces being coplanar with the second longitudinal end of the piezoelectric vibrating element.

3. An acceleration sensor comprising:
    a piezoelectric vibrating element including a plurality of flat rectangular piezoelectric substrates stacked in a thickness direction and charge detecting electrodes respectively disposed on opposite principal surfaces thereof;
    a pair of side-surface spacer members respectively disposed on opposite side surfaces of a first longitudinal end of the piezoelectric vibrating element;
    a pair of rectangular side-surface protection members whose end surfaces at first longitudinal ends and second longitudinal ends thereof are respectively flush with end surfaces at the first longitudinal end and a second longitudinal end of the piezoelectric vibrating element, the pair of rectangular side-surface protection members being respectively spaced apart from the opposite side surfaces of the piezoelectric vibrating element by the pair of side-surface spacer members;
    a pair of principal-surface spacer members respectively disposed on the opposite principal surfaces of the first longitudinal end of the piezoelectric vibrating element as well as on opposite surfaces, adjacent to the opposite principal surfaces, of the pair of side-surface protection members;
    a pair of rectangular principal-surface protection members whose end surfaces at first longitudinal ends and second longitudinal ends thereof are respectively flush with the end surfaces at the first longitudinal end and the second longitudinal end of the piezoelectric vibrating element, the pair of rectangular principal-surface protection members being respectively spaced apart from the opposite principal surfaces of the piezoelectric vibrating element and the opposite surfaces, adjacent to the opposite principal surfaces, of the pair of side-surface protection members by the pair of principal-surface spacer members;
    an end-surface spacer member disposed on the end surfaces at the second longitudinal ends of the pair of principal-surface protection members and the pair of side-surface protection members; and an end-surface protection member spaced apart from the end surfaces at the second longitudinal end of the piezoelectric vibrating element, the pair of principal-surface protection members, and the pair of side-surface protection members by the end-surface spacer member, wherein the end surface space member include respective surfaces that contact the rectangular principal-surface protection members, said respective surfaces being coplanar with the second longitudinal end of the piezoelectric vibrating element.

4. An acceleration sensor comprising:

a piezoelectric vibrating element including a plurality of flat rectangular piezoelectric substrates stacked in a thickness direction and charge detecting electrodes respectively disposed on opposite principal surfaces thereof;

a pair of side-surface spacer members respectively disposed on opposite side surfaces of a first longitudinal end of the piezoelectric vibrating element;

a pair of rectangular side-surface protection members whose end surfaces at first longitudinal ends and second longitudinal ends thereof are respectively flush with end surfaces at the first longitudinal end and a second longitudinal end of the piezoelectric vibrating element, the pair of rectangular side-surface protection members being respectively spaced apart from the opposite side surfaces of the piezoelectric vibrating element by the pair of side-surface spacer members;

a pair of end-surface spacer members respectively disposed on the end surfaces at the second longitudinal ends of the pair of side-surface protection members;

an end-surface protection member spaced apart from the end surfaces at the second longitudinal end of the piezoelectric vibrating element and the pair of side-surface protection members by the end-surface spacer members;

a pair of principal-surface spacer members respectively disposed on the opposite principal surfaces of the first longitudinal end of the piezoelectric vibrating element as well as on opposite surfaces, adjacent to the opposite principal surfaces, of the pair of side-surface protection members and the end-surface protection member; and a pair of rectangular principal-surface protection members respectively spaced apart from the opposite principal surfaces of the piezoelectric vibrating element and the opposite surfaces of the pair of side-surface protection members and the end-surface protection member, adjacent to the opposite principal surfaces, by the pair of principal-surface spacer members, wherein the end surface spacer members include respective surfaces that contact the rectangular principal-surface protection members, said respective surfaces being coplanar with the second longitudinal end of the piezoelectric vibrating element.

5. The acceleration sensor according to claim 1, wherein each of the charge detecting electrodes is extended to the end surface at the first longitudinal end of the piezoelectric vibrating element, and wherein the end surface at the first longitudinal end of the piezoelectric vibrating element is provided with an external terminal electrically connected to the charge detecting electrode.

6. The acceleration sensor according to claim 5, wherein one charge detecting electrode is electrically connected to a first external terminal and another charge detecting electrode is electrically connected to a second external terminal, wherein the first external terminal and the second external terminal are spaced apart from each other, wherein the first external terminal extends from the one charge detecting electrode to a first intersection line as well as from the one charge detecting electrode to a second intersection line, the first intersection line being defined by a first imaginary plane including the end surface at the first longitudinal end of the piezoelectric vibrating element and by a second imaginary plane including an exposed surface of one principal-surface protection member adjacent to the one charge detecting electrode, the second intersection line being defined by the first imaginary plane and a third imaginary plane including an exposed surface of one side-surface protection member adjacent to the one charge detecting electrode, and wherein the second external terminal extends from the other charge detecting electrode to the first intersection line as well as from the other charge detecting electrode to the second intersection line.

7. An acceleration sensor comprising:

a piezoelectric vibrating element including a plurality of flat piezoelectric substrates stacked in a thickness direction and having opposite first and second longitudinal end surfaces, opposite side surfaces having opposite first and second longitudinal ends adjacent the respective first and second longitudinal end surfaces, and opposite principal surfaces having opposite first and second longitudinal ends adjacent the respective first and second longitudinal end surfaces, and charge detecting electrodes respectively disposed on opposite principal surfaces thereof;

a pair of principal-surface spacer members respectively disposed on the first longitudinal ends of the opposite principal surfaces of the piezoelectric vibrating element;

a pair of principal-surface protection members having first and second longitudinal ends which are flush with the first and second longitudinal end surfaces of the piezoelectric vibrating element, the pair of principal-surface protection members being respectively spaced apart from the opposite principal surfaces of the piezoelectric vibrating element by the pair of principal-surface spacer members;

a pair of side-surface spacer members respectively disposed at the first longitudinal ends of the opposite side surfaces of the piezoelectric vibrating element;

a pair of side-surface protection members having first and second longitudinal ends and respectively spaced apart from the opposite side surfaces of the piezoelectric vibrating element and opposite side surfaces of the pair of principal-surface protection members by the pair of side-surface spacer members;

at least one end-surface spacer member disposed on the end surfaces at the second longitudinal ends of the pair of principal-surface protection members and the pair of side-surface protection members; and an end-surface protection member spaced apart from the end surfaces at the second longitudinal end of the piezoelectric vibrating element, the pair of principal-surface protection members, and the pair of side-surface protection members by the end-surface spacer member;

whereby a vibration space is formed around the piezoelectric vibrating element by the pair of principal-surface spacer members, the pair of side-surface spacer members, and the at least one end-surface spacer member, wherein the end surface space member include respective surfaces that contact the rectangular principal-surface protection members, said respective surfaces being coplanar with the second longitudinal end of the piezoelectric vibrating element.

8. The acceleration sensor according to claim 1, wherein the principal-surface spacer members, the end-surface space members, and the side-surface space members comprise one of a prepreg material and a semi-cured adhesive.

9. The acceleration sensor according to claim 2, wherein the principal-surface spacer members, the end-surface space member, and the side-surface space members comprise one of a prepreg material and a semi-cured adhesive.

10. The acceleration sensor according to claim 3, wherein the principal-surface spacer members, the end-surface space member, and the side-surface space members comprise one of a prepreg material and a semi-cured adhesive.

11. The acceleration sensor according to claim 4, wherein the principal-surface spacer members, the end-surface space members, and the side-surface space members comprise one of a prepreg material and a semi-cured adhesive.

* * * * *